US012031309B2

(12) United States Patent
Gunawardena et al.

(10) Patent No.: US 12,031,309 B2
(45) Date of Patent: Jul. 9, 2024

(54) VOICE-CONTROLLED FAUCET

(71) Applicant: AS America, Inc., Piscataway, NJ (US)

(72) Inventors: Mahendra Gunawardena, Hillsborough, NJ (US); Eric Soberano, Barnegat, NJ (US); Alanna Wing Libbrecht, Seattle, WA (US); Verne Myers, Fort Wayne, IN (US); Christopher Thomas Buhowski, Ocean, NJ (US); Noelle Giblin, Spring Lake, NJ (US); Behnam Heydari, Ridgewood, NJ (US); Benjamin Smith, Milwaukee, WI (US)

(73) Assignee: AS America, Inc., Piscataway, NJ (US)

( * ) Notice: Subject to any disclaimer, the term of this patent is extended or adjusted under 35 U.S.C. 154(b) by 915 days.

(21) Appl. No.: 16/962,771

(22) PCT Filed: Jan. 17, 2019

(86) PCT No.: PCT/US2019/013985
§ 371 (c)(1),
(2) Date: Jul. 16, 2020

(87) PCT Pub. No.: WO2019/143798
PCT Pub. Date: Jul. 25, 2019

(65) Prior Publication Data
US 2020/0354932 A1    Nov. 12, 2020

Related U.S. Application Data

(60) Provisional application No. 62/618,571, filed on Jan. 17, 2018.

(51) Int. Cl.
*E03C 1/05*     (2006.01)
*G05B 19/416*   (2006.01)
(Continued)

(52) U.S. Cl.
CPC .......... *E03C 1/057* (2013.01); *G05B 19/416* (2013.01); *G10L 15/22* (2013.01); *G10L 15/30* (2013.01);
(Continued)

(58) Field of Classification Search
CPC .......... E03C 1/057; G10L 15/22; G10L 15/30
See application file for complete search history.

(56) References Cited

U.S. PATENT DOCUMENTS 6,286,764 B1    9/2001   Garvey
9,698,999 B2 *  7/2017   Mutagi ............... H04L 12/2825
(Continued)

OTHER PUBLICATIONS

Gonfalonieri A, How Amazon Alexa works? Your guide toNatural Language Processing (AI), Nov. 21, 2018, https://towardsdatascience.com/how-amazon-alexa-works-your-guide-to-natural-language-processing-ai-7506004709d3 (Year: 2018).*
(Continued)

*Primary Examiner* — Mark A Connolly
(74) *Attorney, Agent, or Firm* — Tyler A. Stevenson; Anna-Lisa L. Gallo

(57) ABSTRACT

A faucet system comprising a faucet; an electronic valve associated with the faucet; and a faucet controller associated with the electronic valve; wherein the faucet controller is configured to receive a faucet command from a command server; and actuate the electronic valve upon receiving the faucet command; wherein the command server is configured to receive a speech-based command from a natural language processing (NLP) server; generate the faucet command from the speech-based command and transmit the faucet command to the faucet controller; and wherein the NLP server is remote to the faucet.

19 Claims, 6 Drawing Sheets

(51) Int. Cl.
   *G10L 15/22*   (2006.01)
   *G10L 15/30*   (2013.01)
   *H04L 67/12*   (2022.01)
(52) U.S. Cl.
   CPC .... *H04L 67/12* (2013.01); *G05B 2219/45006* (2013.01); *G10L 2015/223* (2013.01)

(56) References Cited

U.S. PATENT DOCUMENTS

| | | |
|---|---|---|
| 10,593,328 B1 * | 3/2020 | Wang .................. H04L 65/1059 |
| 11,761,184 B2 | 9/2023 | Veros et al. |
| 2008/0156889 A1 * | 7/2008 | Shapira .............. G05D 23/1393 236/12.12 |
| 2009/0056011 A1 | 3/2009 | Wolf |
| 2017/0254055 A1 | 9/2017 | Xia |
| 2017/0270931 A1 | 9/2017 | Yamagami |
| 2018/0216324 A1 | 8/2018 | Beck et al. |
| 2018/0216325 A1 * | 8/2018 | Chen .................... G05D 7/0635 |
| 2018/0291600 A1 * | 10/2018 | Beck ....................... G06F 3/016 |
| 2019/0087510 A1 * | 3/2019 | Rexach ................ A61B 5/6889 |
| 2019/0089550 A1 | 3/2019 | Rexach et al. |

OTHER PUBLICATIONS

International Search Report mailed Apr. 17, 2019 in corresponding International Application No. PCT/US2019/013985 (4 pages).

* cited by examiner

VOICE-CONTROLLED FAUCET

This disclosure relates generally to controlling plumbing fixtures via voice, and in some embodiments, to controlling faucets via remotely processed voice commands.

BACKGROUND

Conventional faucets can be manually operated by one or more handles to dispense cold or hot water. Currently, faucet products are being developed with built-in microphones and built-in voice recognition engines to provide voice activation capabilities. Such voice activation capabilities may enable users to speak to their faucets to dispense water and provide hands-free interaction. However, such built-in voice recognition implementations are often limited in their speech processing capabilities. Due to the limited hardware and processing capacity on-site at the faucet, these current faucet products may only be capable of processing specific pre-determined voice commands with words in a specific order (e.g., "water on, hot.") These built-in voice recognition engines cannot process a user's natural speech such as "give me hot water" or "turn on hot water," which both indicate that the user wishes the faucet to dispense hot water. Moreover, built-in voice recognition engines cannot be easily updated to take advantage of improvements in speech recognition and processing technologies. For example, the user may need to replace the built-in voice recognition engines with updated hardware to improve voice activation functionality. Such reinstallation of hardware can be burdensome and expensive for the user.

These current faucet products also have a limited operating range because the built-in microphones can only receive and detect a user's voice command within a few feet of the faucet. Therefore, users need to be physically close to the faucets to access the faucet's voice activation capabilities. For example, a user getting up in the morning may wish to take a hot shower. With conventional faucets, the user would need to get out of bed and manually turn on the shower faucet in the bathroom to heat up the water. Even with a built-in speech recognition engine in the faucet, however, the user would still need to get out of bed to enter the bathroom to access the voice activation capabilities.

SUMMARY

As discussed above, current faucets with built-in voice recognition have limited speech recognition capabilities, cannot be easily updated, and have a limited operating range. Embodiments of the present disclosure address these limitations by implementing a voice-controlled faucet that is network-enabled to access natural language processing capabilities provided remotely, for example, in natural language processing (NLP) servers in a cloud. In effect, complex speech recognition and language understanding processing are offloaded to NLP servers that implement the most up-to-date natural language processing technologies. These NLP servers can also be easily configured to provide greater processing capacity and capability than built-in speech recognition engines. Further, a user can issue voice commands to the voice-controlled faucet by speaking to any user device having a microphone and capable of electronically relaying the voice commands to the NLP servers. Therefore, the voice-controlled faucet can be operated remotely without requiring the user to be in close proximity. A remote server may be anywhere on Earth. Likewise, a user may be remote to a faucet to send a command, for example in a next room, about 0.5 m (meter) away, about 1 m away, about 2 m away, about 3 m away, about 4 meter away, about 5 m away, about 10 m away, or more.

In some embodiments, methods and systems for controlling a faucet include: receiving, from a natural language processing (NLP) server, a command associated with faucet functionality, wherein the command is generated based on audio data transmitted from a user device to the NLP server, wherein the audio data represents a voice command spoken by a user to the user device; receiving, from the NLP server, data indicating a user account associated with the user device; selecting a first faucet from one or more faucets associated with the user account; generating a faucet command specific to the first faucet based on one or more properties of the first faucet and the command, the faucet command including whether to actuate a first electronic valve of the first faucet; and transmitting the faucet command to a faucet controller associated with the first faucet, wherein the faucet controller is configured to process the faucet command to actuate the first electronic valve to control the first faucet according to the voice command. A controller may mean a microcontroller or microprocessor. A faucet controller associated with a first faucet is also associated with a first electronic valve and in electrical communication with the first electronic valve.

In some embodiments, methods and systems for controlling a faucet includes: receiving, from a natural language processing (NLP) server, a command associated with faucet functionality, wherein the command is generated based on audio data transmitted from a user device to the NLP server, wherein the audio data represents a voice command spoken by a user to the user device; receiving, from the NLP server, data indicating a user account associated with the user device; selecting a first faucet from one or more faucets associated with the user account; generating a faucet command specific to the first faucet based on one or more properties of the first faucet and the command, the faucet command including whether to actuate a first electronic valve of the first faucet; and transmitting the faucet command to a faucet controller associated with the first faucet, wherein the faucet controller is configured to process the faucet command to actuate the first electronic valve to control the first faucet according to the voice command.

In some embodiments, the methods and systems include: retrieving, from a database, the one or more properties associated with the first electronic valve. In some embodiments, the methods and systems include: receiving one or more indicators from a presence sensor associated with the first faucet indicating that the user is within a threshold distance of the first faucet; and selecting the first faucet based on the one or more indicators. In some embodiments, the command includes a plurality of parameters that include one or more of a flow rate, an amount of fluid, a temperature, a time interval, a time, a faucet indicator, or a faucet mode. In some embodiments, a presence sensor is one or more of an infrared (IR) sensor, a light sensor, a radar sensor, a micro-radar sensor or a short or mid-range capacitive field sensor.

In some embodiments, the faucet command includes an operating pattern of the first electronic valve. In some embodiments, the operating pattern includes a time interval to open the first electronic valve. In some embodiments, the command includes a parameter specifying an amount of fluid to dispense, and the systems and method include determining the operating pattern based on the amount of fluid and the properties of the first faucet.

In some embodiments, an operating pattern may be determined by the command server. In other embodiments an operating pattern may be determined by the faucet controller. For instance, the command server and/or the faucet controller may be configured to determine an operating pattern based on an amount of fluid and properties of the faucet.

In some embodiments, the operating pattern includes a plurality of time intervals to open the first electronic valve and a plurality of time intervals to close the first electronic valve. In some embodiments, the properties include one or more of a flow rate, a flow factor, a number of valves, a type of fluid dispensed, a type of each of the valves, or a type of faucet.

In some embodiments, the command includes a first faucet indicator associated with the first faucet, and analyzing the command includes: querying a table of mappings between the one or more faucet and corresponding one or more faucet indicators based on the first faucet indicator to select the first faucet. In some embodiments, the first electronic valve includes a solenoid valve.

In some embodiments, the systems and methods include: determining that the first faucet is coupled to the first electronic valve and to a second electronic valve, wherein the first electronic valve controls a flow of fluid at a first temperature and the second electronic valve controls flow of fluid at a second temperature; and wherein the faucet command includes a first operating pattern for the first electronic valve and a second operating pattern for the second electronic valve.

In some embodiments, the first faucet is determined to be coupled to the first electronic valve and to the second electronic valve based on the one or more parameters. In some embodiments, the command specifies a temperature spoken by the user in the voice command, and wherein the first operating pattern and the second operating pattern are generated to control the first faucet to provide fluid at the temperature. The temperature spoken may be a specific temperature, for example, 32° F., 40° F., 150° F., 165° F. or 210° F. The temperature spoken may be in general terms, for instance, "hot", "warm", "luke-warm", "cold" or "ice-cold". Such general temperatures may be pre-defined. In some embodiments, such general temperatures may be defined by a user and configured into their preferences in a user database. User preferences may be retrievable by the command server and processed into the faucet command.

In some embodiments, the systems and methods include: receiving measurements from one or more sensors located proximate to the first faucet; and generating the faucet command in accordance with the measurements. In some embodiments, the systems and methods include: receiving additional measurements after generating the faucet command; and updating the faucet command in accordance with the additional measurements. The term "measurements" may mean data or input.

In some embodiments, the one or more sensors include: a capacitive sensor, a flow sensor, a temperature sensor, a presence sensor, an infrared (IR) sensor, a light sensor, or a pressure sensor. In some embodiments, the command includes a parameter specifying a first faucet mode. In some embodiments, the command includes a parameter specifying a first faucet mode, and generating the faucet command includes: querying a database of faucet modes based on the first faucet mode to determine an operating pattern of the first electronic valve. In some embodiments, the database stores a first quantity of fluid to dispense for the first faucet mode, and the operating pattern includes a time interval to open the first electronic valve to dispense the first quantity of fluid.

In some embodiments, the database stores a first time duration for the first faucet mode, and wherein the operating pattern includes the first time duration to open the first electronic valve. In some embodiments, the command is associated with a mode including one or more settings for operating the first faucet, and wherein the faucet controller is configured to actuate the first electronic valve to control the first faucet in accordance with the one or more settings.

In some embodiments, the one or more settings specify how the faucet controller responds to non-voice related inputs. In some embodiments, the non-voice related inputs include an input from at least one of a touch sensor, a measurement sensor or a mechanical device for operating the first faucet. Mechanical devices include levers, knobs, handles, buttons, etc. Measurement sensors include flow rate sensors, temperature sensors, drain sensors, presence sensors, infrared (IR) sensors, light sensors, gesture sensors, radar sensors, micro-radar sensors, capacitive sensors (e.g. short or mid-range capacitive sensors), pressure sensors, handle position sensor, etc. Touch sensors include touch screens and buttons. A faucet body may comprise a touch sensor. In some embodiments, a faucet body may comprise one or more capacitive sensors. A button may be an electromechanical button or a capacitive button. Touch input may include a characteristic of the fluid such as, for example, hot/cold, filtered/non-filtered, a dispensed amount, etc. Touch input may also include on/off toggling. In some embodiments, a selection of what is controlled by on/off toggling may depend on a faucet mode.

One or more sensors "proximate" or "local" to a faucet may be associated with and in electrical communication with the faucet controller. The one or more sensors may also be associated with and in electrical communication with the electronic valves associated with the faucet. A valve position may be communicated to the faucet controller. A mechanical device may be associated with a sensor, which sensor may detect a position of the mechanical device and communicate this to the faucet controller. In some embodiments, a mechanical device may be considered to be in electrical communication with a faucet controller via a sensor. A faucet controller is in electrical communication with an electronic valve. Electrical communication may be wired or wireless communication.

Accordingly, the faucet systems and methods may comprise one or more touch sensors and/or measurement sensors. A sensor may be associated with and in electronic communication with a faucet controller.

In some embodiments, a faucet controller may generate and communicate a "local command" based on input received from a proximate sensor (a locally-generated command). Accordingly, a faucet controller may be configured to communicate a voice-generated command to an electronic valve and/or to communicate a local command to an electronic valve. One command may override the other based on system settings. One command may complement or modify the other based on system settings.

For example, a faucet controller may be configured to interpret, modify and execute a faucet command from a command server. In an example, a user might issue a voice command for 60% warm water; the command server may instruct the faucet controller to open hot water electronic valve fully and cold water electronic valve to a ⅔ position. Alternatively, with the same voice command, a command server may instruct a faucet controller to provide 60% warm water; and the faucet controller determines to open hot water electronic valve fully and cold water electronic valve to a ⅔ position.

In some embodiments, faucet modes include a standby mode, a manual control mode, a quick control mode, a measured dispensing mode, a temperature/flow rate mode, a treatment mode, a hand wash mode, a maintenance mode and a dishwashing mode. A certain mode may determine if a local command may override a speech-generated command or vice-versa, or if one command should modify the other. A faucet mode may be determined via a voice-generated command or a local command.

In a standby mode, all valves may be in a closed position. The valve positions may be communicated by one or more local sensors to the faucet controller. The faucet controller is ready to receive input from the command server and/or one or more sensors and/or one or more mechanical devices. Mechanical devices include for example handles, levers or knobs associated with a faucet.

In a manual mode, a user may be operating a mechanical device, for example operating a handle to request a fluid. The system may be configured such that a manual mode overrides any voice-generated command.

In a quick control mode, in some embodiments, a user may request a fluid via a local sensor, for instance via a touch sensor or an IR sensor. The system may be configured such that a quick control mode overrides any voice-generated command.

In a measured dispensing mode, a faucet may be directed to dispense a measured quantity of fluid via a voice-generated command and/or a local command. In some embodiments, quantity may mean time and/or volume.

In a temperature/flow rate mode, a faucet may be directed to dispense a fluid at a certain temperature and/or flow rate. The fluid may be a single fluid flow at a target temperature or, it may comprise a certain mix of hot/cold fluids to arrive at the target temperature and/or the faucet may be directed to dispense liquid at a target flow rate. Temperature/flow rate instructions may be voice-generated and/or local commands.

In a treatment mode, a faucet may be directed to dispense for instance filtered water, carbonated water, ozonated water, etc. Instructions may be voice-generated and/or local commands.

In a hand wash mode, a faucet may be directed to dispense in some embodiments a fluid at a certain temperature for a certain time and/or volume appropriate for handwashing. In some embodiments, both water and a washing liquid (e.g. liquid soap) may be dispensed for a certain time and/or volume appropriate for handwashing. Instructions may be voice-generated and/or local commands.

In a maintenance mode, input from one or more proximate sensors may be ignored (sensors disabled) for a certain period of time, for instance from about 0.5 minutes or about 1.0 minutes to about 1.5 minutes or about 2.0 minutes or more until a further voice-generated command or input from one or more certain local sensors is communicated to the faucet controller. In a maintenance mode, the faucet and/or associated sink, tub, shower, etc. are for instance being cleaned or repaired.

In a dishwashing mode, one or more sensors, in some embodiments forward or downward facing IR sensors, are enabled to toggle water flow.

In some embodiments, the system may react to communication from one or more proximate sensors depending on the current mode. For example, when in a measured dispensing mode, input from a local touch and/or IR sensor may cause the faucet controller to override any voice-generated command and the electronic valve will receive a local command. When in a standby mode, input from a local touch and/or IR sensor may place the system into a quick control mode.

In some embodiments, a faucet mode is determined by the command server in response to a speech-based command or is determined by the faucet controller in response to a non-voice input.

In some embodiments, a mode may be specified for the system based on a mode priority (modes are assigned a priority); a mode may be selected based on the most recently requested mode; a mode may be specified based on what modes are requested most; or any combination of this.

For instance, in some embodiments, modes may be prioritized from 1 (highest priority) as follows: maintenance (1); manual control (2); quick control (3); temperature or flow rate (4); treated water (5); measured dispensing (6); hand wash (7); dishwashing (8); and standby (9).

In some embodiments, methods and systems for controlling a faucet include: at a user device: receiving a voice command spoken by a user, and transmitting, to a natural language processing (NLP) server, information associated with the user device and audio data representing the voice command; at the NLP server: receiving, from the user device, the information and the audio data, identifying a user account associated with the user based on the information, recognizing speech from the audio data, selecting a faucet service from a plurality of services associated with the user account based on determining that the speech is associated with faucet functionality, generating a command associated with faucet functionality based on the speech, and transmitting the command and data indicating the user account to a command server associated with the faucet service; at a command server: receiving, from the NLP server, the command associated with faucet functionality, receiving, from the NLP server, the data indicating the user account, analyzing the command to select a first faucet from one or more faucets associated with the user account, generating a faucet command specific to the first faucet based on one or more properties of the first faucet and the command, the faucet command including whether to actuate a first electronic valve of the first faucet, and transmitting the faucet command to a faucet controller associated with the first faucet; at the faucet controller: receiving the faucet command, and actuating the first electronic valve based on the faucet command to control the first faucet according to the voice command.

In some embodiments, a system for controlling a faucet includes one or more processors, memory, and one or more programs stored in the memory and configured to be executed by the one or more processors, the one or more programs including instructions for: receiving, from a natural language processing (NLP) server, a command associated with faucet functionality, wherein the command is generated based on audio data transmitted from a user device to the NLP server, wherein the audio data represents a voice command spoken by a user to the user device; receiving, from the NLP server, data indicating a user account associated with the user device; analyzing the command to select a first faucet from one or more faucets associated with the user account; generating a faucet command specific to the first faucet based on one or more properties of the faucet and the command, the faucet command including whether to actuate a first electronic valve of the first faucet; and transmitting the faucet command to a faucet controller associated with the first faucet, wherein the faucet controller is configured to process the faucet command to actuate the first electronic valve to control the first faucet according to the voice command.

In some embodiments, a non-transitory computer-readable storage medium includes one or more programs that when executed by a device having one or more processors cause the one or more processors to perform instructions including: receiving, from a natural language processing (NLP) server, a command associated with faucet functionality, wherein the command is generated based on audio data transmitted from a user device to the NLP server, wherein the audio data represents a voice command spoken by a user to the user device; receiving, from the NLP server, data indicating a user account associated with the user device; selecting a first faucet from one or more faucets associated with the user account; generating a faucet command specific to the first faucet based on one or more properties of the first faucet and the command, the faucet command including whether to actuate a first electronic valve of the first faucet; and transmitting the faucet command to a faucet controller associated with the first faucet, wherein the faucet controller is configured to process the faucet command to actuate the first electronic valve to control the first faucet according to the voice command.

BRIEF DESCRIPTION OF THE DRAWINGS

The foregoing summary, as well as the following detailed description of embodiments, is better understood when read in conjunction with the appended drawings. For the purpose of illustrating the present disclosure, the drawings show example embodiments of the disclosure; the disclosure, however, is not limited to the specific methods, systems and instrumentalities disclosed.

DETAILED DESCRIPTION

Described herein are exemplary embodiments of voice-controlled faucet systems and methods. The systems and methods allow for remote operation of a faucet, remote in this case meaning from another room of a home or from some other location outside of a home. A "faucet" means any faucet inside or outside of a home, for instance a faucet associated with a kitchen, bathroom or other sink, a shower, a bathtub or a garden (e.g. a garden hose).

Figure 1:
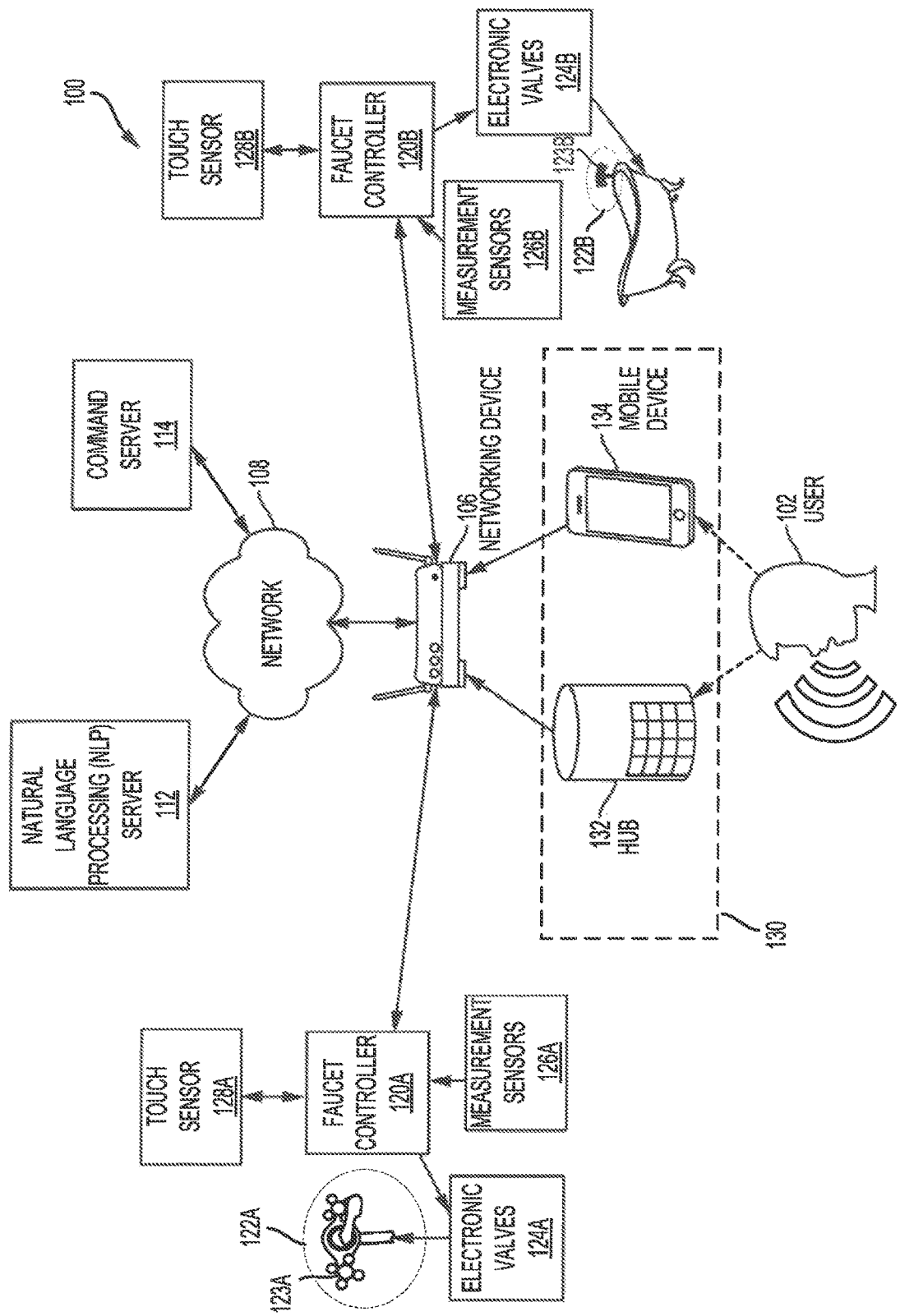
FIG. 1 illustrates a system for providing voice-controlled faucets in accordance with some embodiments.

FIG. 1 illustrates a system 100 for providing voice-controlled faucets such as faucet 122A and faucet 122B, according to some embodiments. System 100 includes a networking device 106 that enables faucet controllers 120A and 120B and user devices 130 to communicate with a natural language processing (NLP) server 112 and a command server 114 via network 108. NLP server 112 can also communicate with command server 114 through network 108. In some embodiments, networking device 106 can include a gateway, a router, a modem, a wireless access point, or a combination thereof.

In some embodiments, network 108 can include a local area network (LAN), a wide area network (WAN), the Internet, a Wi-Fi network, a WiMAX network, a cellular network (e.g., 3G, 4G, or 4G Long Term Evolution (LTE)), a cloud network, or a combination thereof. Further, network 108 may implement one or more wired and/or wireless standards or protocols.

In some embodiments, a user 102 can speak voice commands to one or more of user devices 130 to control functionality of one or more faucets 122A and 122B. User devices 130 are computing devices that have one or more microphones for receiving voice commands from user 102 and that implement one or more network interfaces for communicating the voice command over network 108. In some embodiments, user devices 130 may include network chips and network interfaces that enable user devices 130 to directly access network 108 or to indirectly access network 108 through networking device 106. For example, user devices 130 may include hub 132 and mobile device 134. Hub 132 may include a smart speaker such as AMAZON ECHO, ECHO DOT, GOOGLE HOME, APPLE HOMEPOD, SAMSUNG SMARTHUB, and the like. Mobile devices 134 may include a cell phone, a smart phone, a tablet, a smart watch, among other portable devices operated by user 102. In some embodiments, user device 130 can stream or record a voice command of user 102 for transmitting to NLP server 112. In some embodiments, the voice command can be transmitted as an audio file (e.g., WAV, FLAC, MP3, etc.).

As will be further described below with respect to FIG. 2, NLP server 112 can generate a command associated with faucet functionality based on analysis of the audio data received from one or more of user devices 130. The command associated with faucet functionality can be a data structure that is generated by NLP server 112 to be interpreted and processed by command server 220. In some embodiments, NLP server 112 can recognize and transcribe speech from the audio data. Then, NLP server 112 may extract meaning from the speech. Based on the extracted meaning, NLP server 112 can generate the command to include one or more parameters associated with faucet functionality. In some embodiments, a parameter may include indicators associated with a specific type of meaning extracted from the speech.

Upon generating the command, NLP server 112 may transmit the command to command server 114 for generating faucet commands to control specific faucets 122A and/or 122B. A faucet command can be a data structure generated by NLP server 112 to be interpreted and processed by a faucet controller. As will be further described below with respect to FIG. 2, command server 114 can determine a specific faucet, such as faucet 122A, specified in the user's voice command based on the command received from NLP server 112. Further, command server 114 may generate a faucet command to control one or more electronic valves 124A of faucet 122A. In some embodiments, upon generating the faucet command specific to, for example, faucet 122A, command server 114 can transmit the faucet command to faucet controller 120A via network 108. In some embodiments, some or all of the functionality provided by command server 114 may be performed locally at faucet controller 120A.

In some embodiments, to provide voice-controlled faucets that leverage the remote, high-capacity natural language processing capabilities of NLP server 112, system 100 can include a faucet controller 120A communicatively coupled to one or more electronic valves 124A for controlling how, which, and whether specific fluid is to be dispensed by faucet 122A. For example, the one or more electronic valves 124A may include a solenoid valve, a dual-solenoid valve, a pump, among other types of valves. In some embodiments, electronic valves 124A can include: a first electronic valve for controlling cold water flow, and a second electronic valve for controlling hot water flow. In some embodiments, faucet controller 120A can be powered via wall socket or batteries. Further, faucet controller 120A may receive information monitored by one or more measurement sensors 126A to expand the types of voice commands that can be provided by faucet controller 120A.

In some embodiments, as shown in system 100, faucet 122A can be configured to include one or more mechanical devices 123A (e.g., a lever, a knob, a handle, a button, etc.) that allows the user to operate faucet 122A without issuing voice command. In some embodiments, a status of one or more mechanical devices 123A may be detected by one of measurement sensors 126A and provided to faucet controller 120A. In some embodiments, the user may operate mechanical devices 123A to override any faucet command being executed by faucet controller 120A.

In some embodiments, faucet controller 120A can actuate one or more electronic valves 124A to control characteristics of fluid dispensation by faucet 122A. In some embodiments, these characteristics may include, without limitation, on/off, one or more flow rates, a range of flow rates, a temperature, a flow rate change, a measured quantity of fluid to dispense, a temperature change, or a type of fluid. In some embodiments, faucet controller 120A can control a plurality of electronic valves 124A to control the type of fluid to dispense. For example, the plurality of electronic valves 124A may include valves for dispensing one or more of the following types of fluids: cold water, hot water or beverage, filtered water, non-filtered water, ozonated water, tea, carbonated water (which may also be referred to as sparkling water or soda water), a type of soda, liquid hand soap, dish washing detergent, laundry detergent, bathroom cleaner, or one or more combinations thereof. Hot water or beverage in some embodiments may be from about 160° F. to below 212° F.

In some embodiments, faucet controller 120A can be coupled to touch sensor 128A for receiving touch inputs from the user or an IR sensor or user presence detection. For example, touch sensor 128A may be a touch screen, a button, or the like. In some embodiments, faucet controller 120A can be configured to control one or more characteristics of fluid dispensed by faucet 122A based on touch input provided by the user and received by touch sensor 128A. For example, the touch input may be a selection of a characteristic of the fluid such as, for example, hot/cold, filtered/non-filtered, a dispensed amount, etc.

In some embodiments and as described above, faucet controller 120A can be configured to control the characteristics of the fluid being dispensed by faucet 122A in accordance with a faucet command received from and generated by command server 114. In some embodiments, faucet controller 120A can be configured to control the characteristics of the fluid being dispensed by faucet 122A in accordance with one or more of: the faucet command from command server 114, measurement sensors 126A, or touch sensor 128A. For example, one of measurement sensors 126A may indicate that a vessel has been filled. In response to receiving that indication, faucet controller 120A may be configured to halt execution of the faucet command. In another example, touch sensor 128A may indicate that the user has selected, for example, a specific temperature. Upon receiving the specific temperature, faucet controller 120A may be configured to dispense fluid according to the faucet command, but the fluid may be controlled to dispense at the specific temperature.

In some embodiments, while faucet controller 120A is controlling faucet 122A to operate according to a first faucet command, faucet controller 120A may receive information from touch sensor 128A (e.g., a user selection to change a characteristic of the fluid being dispensed), measurement sensors 126A (e.g., a sink basin is full), or command server 114 (e.g., a second faucet command). In these embodiments, faucet controller 120A can be configured to stop or adjust the execution of the first faucet command according to the received information depending on one or more settings of a currently operating mode of faucet 122A. For example, a currently operating mode may be a measured fill mode where faucet 122A is dispensing a first amount of fluid as specified in the first faucet command. In this example, faucet controller 120A may receive, via touch sensor 128A, a user's selection to add a second amount of fluid to be dispensed. In response, while in the measured fill mode, faucet controller 120A may control faucet 122A to dispense a third amount of fluid that sums the first and second amounts.

In some embodiments, faucet controller 120A can be configured to control an operation of touch sensor 128B based on a receipt of the first faucet command from command server 114 or based on a currently operating mode of faucet 122A. For example, if faucet 122A is in a child lock mode, faucet controller 120A may ignore information received from touch sensor 128A.

In some embodiments, faucet controller 120A can include one or more network interfaces for communicating with command server 114 via networking device 106. For example, faucet controller 120A may transmit information associated with measurement sensors 126A or touch sensor 128A to command server 114. Additionally, faucet controller 120A can receive, from command server 114, one or more faucet commands that instruct faucet controller 120A to actuate the one or more electronic valves 124A to enable user 102 to control faucet 122A via voice commands.

In some embodiments, the one or more measurement sensors 126A can measure one or more characteristics associated with faucet 122A. For example, measurement sensors 126A may include a capacitive sensor, a camera, or a presence sensor to detect a presence of fluid in a basin or a vessel or an amount of the fluid in the basin or the vessel. Additionally, measurement sensors 126A may include a presence sensor to detect whether user 102 is within a threshold range of faucet 122A. The presence sensor may be a motion sensor, an infrared (IR) sensor, or a light sensor. In some embodiments, the one or more measurement sensors 126A can measure characteristics associated with one or more electronic valves 124A of faucet 122A. For example, for each of electronic valves 124A, measurement sensors 126A may include one or more of a flow sensor for measuring an instantaneous rate of fluid, a change in the rate of fluid flow, a temperature sensor for measuring an instantaneous temperature of fluid, whether fluid is flowing, a type of fluid, and the like.

Similarly, much like for faucet 122A, system 100 can include a faucet controller 120B that receives information from touch sensor 128B or one or more measurement sensors 126B and controls one or more electronic valves 124B to control faucet 122B. In some embodiments, faucet controller 120B can control electronic valves 124B based on one or more of: information from measurement sensors 126B, a faucet command from command server 114 through network 108, or an input received at touch sensor 128B. Additionally, in some embodiments, faucet 122B may be configured to include one or more mechanical devices 123B (e.g., a lever, a knob, a handle, a button, etc.) that allows the user to operate faucet 122B without issuing voice commands.

In some embodiments, a number and a type of each of electronic valves 124B communicatively coupled to faucet controller 120B may be different depending on the type of faucet 122B. For example, faucet 122B may be a shower faucet associated with three electronic valves 124B: a cold water valve, a hot water value, and a drain valve. In some embodiments, the faucet command generated by command server 114 and received at faucet controller 120B can be executed to control one or more of the three example electronic valves to provide a specific functionality requested by user in the spoken voice command. For example, user 102 may be finished taking a bath and issue a voice command to drain the bath. In this example, the faucet command may include instructions to shut off the cold water valve if it is currently opened, shut off the hot water valve if it is currently opened, and open the drain valve if it is currently closed. In other embodiments, if a user is finished taking a shower, a faucet command may include instructions to shut off hot and cold water valves. In other shower embodiments, a shower may include multiple valves associated with multiple outlets, for instance a showerhead, a hand-held outlet, a rain shower outlet and a body spray outlet. Each of the outlets may be independently controlled with voice-generated faucet commands.

Figure 2:
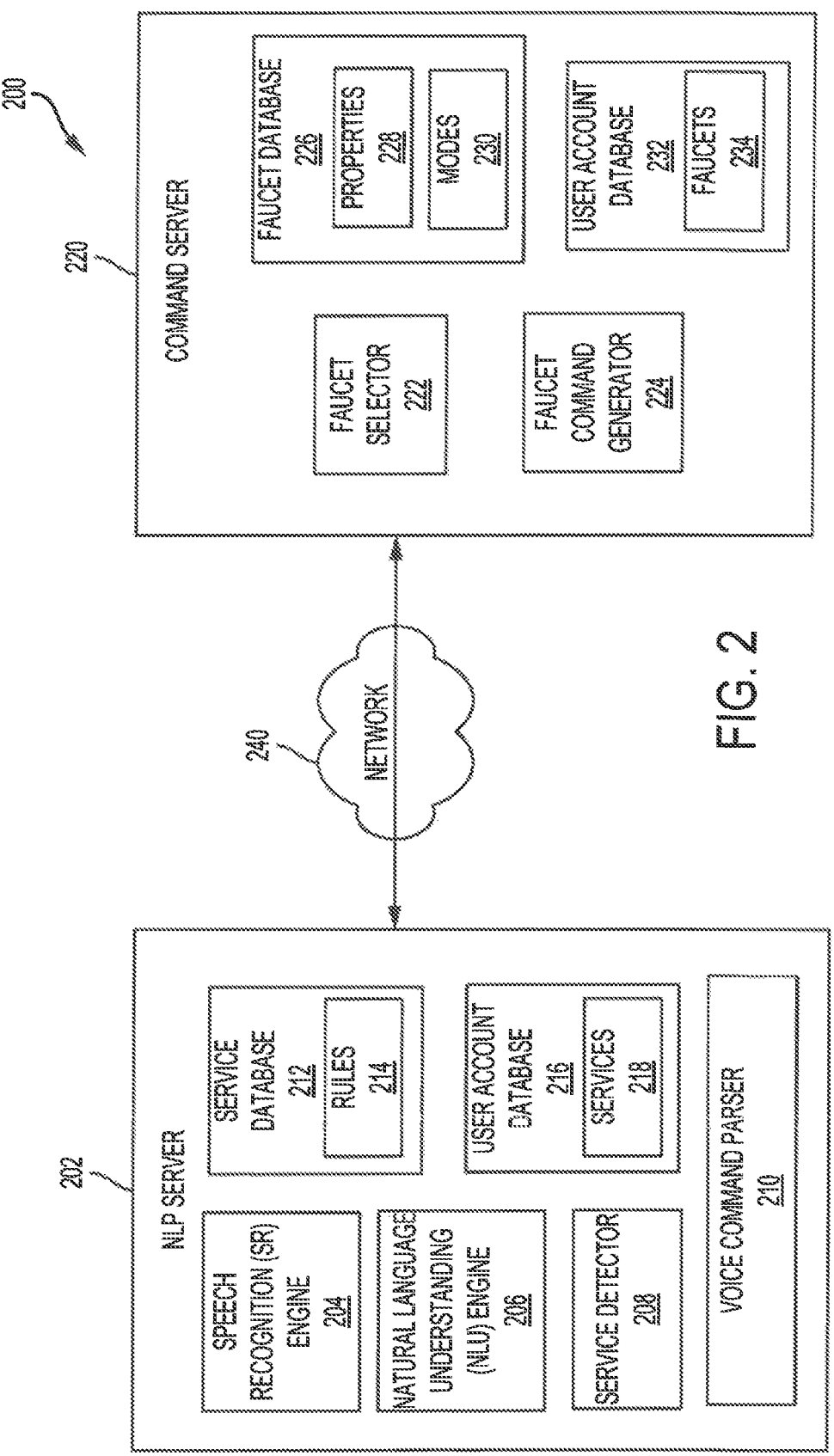
FIG. 2 illustrates a system for processing voice commands in accordance with some embodiments.

FIG. 2 illustrates a system 200 for processing voice commands, according to some embodiments. System 200 includes an NLP server 202 that communicates with command server 220 via network 240. In some embodiments, NLP server 202 and command server 220 correspond to NLP server 112 and command server 114, respectively, as described with respect to FIG. 1. Additionally, network 240 may correspond to network 108 as described with respect to FIG. 1.

In some embodiments, functionality provided by NLP server 202 can be implemented by a network-accessible platform including one or more servers. NLP server 202 may include one or more processors coupled to computer-readable media storing computer instructions that, when executed, cause NLP server 202 to execute or enable the methods disclosed herein.

In some embodiments, NLP server 202 may be implemented as part of a "cloud" where a network of remote servers hosted over the Internet or on a private network provides shared computer processing resources (e.g., computer networks, servers, data storage, applications, and services). For example, functionality of NLP may be provisioned within a cloud computing service such as Amazon Web Services (AWS), IBM SmartCloud, Microsoft Azure, Google Cloud Platform, etc. The network-accessible platform implemented by NLP server 202 can be referred to as "on-demand computing," "software as a service (SaaS)," "data center," "cloud computing," and the like.

As shown in system 200, NLP server 202 may include service database 212 and user account database 216. In some embodiments, user account database 216 stores services 218 associated with each user account. In some embodiments, a user account can be identified by a user account ID such as a username or an email address. For example, for a user account ID, e.g., "firstuser," user account database 216 may include a table storing the following example services: music playing service, thermostat control service, TV service, faucet service, etc.

In some embodiments, service database 212 stores rules 214 associated with each service. Rules 214 may be stored rules or logic that associate one or more respective parameters with one or more words or phrases (e.g., semantic information) or language syntactical structure (e.g., syntax information). As a result, rules 214 can be used to map various phrases in the voice command to a specific parameter. In some embodiments, service database 212 can store rules 214 to associate with each parameter from a plurality of parameters. For example, the plurality of parameters may be associated with one or more flow rates, a type of fluid, an amount of fluid in a specific measuring unit, a faucet indicator, a vessel indicator, a temperature of fluid, a mode for a faucet, a time interval, or a specific time (e.g., a time of day and/or date). As an example, for a parameter representing a temperature of fluid, the semantic rules may indicate that words such as "Celsius" and "Fahrenheit" are both associated with the parameter representing temperature.

In some embodiments, a parameter may be a mode for operating a faucet. For example, the mode may be associated with dispensing cold water, dispensing hot water, dispensing filtered water, filling a pot, filling a bath tub, running garbage disposal, etc. In some embodiments, rules 214 may be provided by command server 220 to NLP server 202. For example, for a mode of dispensing cold water, rules 214 may include information to indicate a plurality of words, phrases, or syntax structure that NLP server 202 can use to determine that the mode to dispense cold water is being requested in the voice command.

In some embodiments, NLP server 202 includes the capability to parse and interpret voice commands represented by audio data received from user devices, such as user device 130 of FIG. 1. In some embodiments, to process the audio data, NLP server 202 includes the following components: speech recognition (SR) engine 204, natural language understanding (NLU) engine 206, service detector 208, and voice command parser 210. One or more of these components may retrieve data from service database 212 or user account database 216, according to some embodiments.

In some embodiments, SR engine 204 can receive audio data from a user device. SR engine 204 may implement various speech processing techniques to recognize speech in the audio data representing a user's voice command. For example, these speech processing techniques may include one or more of artificial neural networks, acoustic models, or language models to recognize words of speech from the audio data. In some embodiments, SR engine 204 can transcribe audio signals stored in the audio data into a text stream to be processed by NLU engine 206.

In some embodiments, NLU engine 206 can analyze the text stream generated by SR engine 204 to extract meaning from the voice command represented by the audio data. In some embodiments, NLU engine 206 may use parser and grammar rules to analyze the formatted data to generate a formatted representation of a meaning of the voice command in a formally defined language. In some embodiments, the capability of NLU engine 206 to generate the same formatted representation for variations of the voice command may allow users to use more natural phrases to issue voice commands as opposed to the rigid, pre-determined voice commands requested by built-in voice recognition engines in current faucet products.

In some embodiments, service detector 208 can analyze the audio data to determine which service is being requested in the voice command represented by the audio data. In some embodiments, service detector 208 analyzes the text stream generated by SR engine 204 or the formatted representation generated by NLU engine 206 to determine the service being requested.

In some embodiments, service detector 208 receives, from the user device, information associated with the user or the user device to determine that the user has a user account. Then, service detector 208 can query user account database 216 for services 218 linked to the user account. In some embodiments, service detector 208 can select a faucet service from services 218 based on information derived from the audio data.

In some embodiments, voice command parser 210 generates a command associated with faucet functionality for transmitting to command server 220. In some embodiments, the command includes one or more parameters with values being extracted from the text stream generated by SR engine 204. In some embodiments, upon generating the command, voice command parser 210 may receive a service identifier, such as an IP address, associated with command server 220 from user account database 216. Then, voice command parser 210 may transmit the command to command server 220 using the service identifier.

In some embodiments, much like NLP server 202, functionality provided by command server 220 can be implemented by a network-accessible platform including one or more servers. Command server 220 may include one or more processors coupled to computer-readable media storing computer instructions that, when executed, cause command server 220 to execute or enable the methods disclosed herein. Similar to NLP server 220, command server 220 may also be implemented as part of a "cloud," as discussed above. NLP server 202 and command server 220 may be hosted in the same "cloud" or part of different "clouds."

In some embodiments, user account database 232 stores mappings between faucets 234 and user accounts. For example, user account database 232 may include a first table storing mappings between one or more faucets for a first user account. In some embodiments, each of the one or more faucets in the first table may be identified based on a faucet indicator. For example, a first faucet indicator for a first faucet may include an IP address associated with the first faucet.

In some embodiments, faucet database 226 includes properties 228 associated with faucets 234. In some embodiments, properties 228 can include characteristics of one or more electronic valves associated with a faucet from faucets 234. For example, properties 228 for a first faucet may include information indicating that the first faucet is associated with a number of electronic valves and the information may also include characteristics for each electronic valve. In some embodiments, properties 228 of an electronic valve can include one or more flow rates, a range of flow rates, a flow factor, a type of fluid being dispensed, a type of the valve, or a combination thereof. By accessing properties 228 of faucets 234 stored in faucet database 226, command server 220 can take into account the varying characteristics of one or more valves coupled to a faucet to generate faucet commands specific to that faucet to increase the accuracy of the faucet commands.

In some embodiments, faucet database 226 includes modes 230 associated with each of faucets 234. In some embodiments, modes 230 can be stored in association with each user account from user account database 232. In some embodiments, modes 230 can include a plurality of function indicators associated with providing specific functionality at a faucet. In some embodiments, command sever 220 may query tables storing associations between modes 230 and operating patterns. For example, each mode may be stored in association with one or more operating patterns for one or more electronic valves associated with a first faucet. In some embodiments, an operating pattern stored in association with a mode may include preconfigured information indicating an amount of a type of fluid to dispense, a temperature of a type of fluid to dispense, one or more time intervals to dispense a type of fluid, or one or more specific times to dispense the type of fluid.

In some embodiments, each mode of modes 230 can be configured to be associated with a plurality of settings for operating a faucet associated with that mode. In some embodiments, a setting of the plurality of settings may include preconfigured characteristics of fluid dispensed by the faucet. For example, the preconfigured characteristics may include a temperature, hot/cold, a type of the fluid, etc. In some embodiments, the setting may include a predefined duration of time to remain in the mode. In some embodiments, the setting may include a priority level of the mode. The priority level of the mode may be analyzed by a faucet controller to determine whether the mode can be overridden by another mode, as will be further described with respect to FIG. 5.

In some embodiments, a mode may include one or more settings that govern how a faucet responds to non-voice-related inputs. For example, as shown in FIG. 1, faucet controller 120A controlling faucet 122A may receive inputs from measurement sensors 126A and user inputs from one or more of touch sensor 128A or mechanical devices 123A. In some embodiments, the mode may control how faucet controller 120A responds to the one or more inputs from measurement sensors 126A, touch sensor 128A, or mechanical devices 123A. In some embodiments, the mode may specify which of measurement sensors 126A, touch sensor 128A, or mechanical devices 123A are enabled or disabled. For example, while faucet controller 120A is in a first mode, the one or more settings of the first mode may specify, for example, whether faucet controller 120A responds to inputs from touch sensor 128A. In some embodiments, the mode may specify what actions are executed (e.g., which valves are actuated and/or the timing and manner by which they are actuated) in accordance with predefined inputs. For example, the same input may in one mode cause a first valve to be actuated, and may in a second mode cause a second valve to be actuated; alternately, the same input may in one mode cause a valve to be actuated in a first manner, and may in a second mode cause the same valve to be actuated in a second, different manner.

In some embodiments, modes 230 can be configured by a user. For example, the user can access modes 230 associated with his user account through a web browser. Then, the user may add additional modes 230 or configure existing modes 230 to be associated with one or more specified settings or specific operating patterns of one or more electronic faucets.

In some embodiments, command server 220 includes the capability to generate faucet commands specific to faucets based on the commands received from NLP server 202. In some embodiments, to generate the faucet commands, command server 220 includes the following components: faucet selector 222 and faucet command generator 224. One or more of these components may retrieve data from faucet database 226 or user account database 232, according to some embodiments.

In some embodiments, faucet selector 222 can receive the command associated with faucet functionality from NLP server 202. In some embodiments, faucet selector 222 can also receive, from NLP server 202, data indicating a user account. Based on the data and the command, faucet selector 222 can determine that a user's voice command should be issued to a first faucet from one or more faucets associated with the user account. In some embodiments, faucet selector 222 can query a table storing mappings between one or more faucets 234 and the user account to select the first faucet. In some embodiments, as will be described with respect to FIG. 4, faucet selector 222 can select the first faucet based on information measured by one or more sensors associated with the first faucet.

In some embodiments, faucet command generator 224 can analyze the command received from NLP server 202 to generate a faucet command for controlling one or more electronic valves of the first faucet. In some embodiments, faucet command generator 224 can generate the faucet command based on retrieving properties 228 associated with the first faucet in faucet database 226. For example, faucet command generator 224 can retrieve properties 228 to determine one or more electronic valves associated with the first faucet. In some embodiments, as will be described with respect to FIG. 4, faucet command generator 224 can generate the faucet command based on information measured by one or more sensors associated with the first faucet.

In some embodiments, the faucet command generated by faucet command generator 224 includes an operating pattern for each of one or more electronic valves associated with the first faucet. In some embodiments, the operating pattern includes control information for a specific valve. For example, the control information indicates whether that valve should be opened or closed, how much that valve should be opened or closed, a time interval to open or close that valve, a specific time to open or close that valve, or a combination thereof. In some embodiments, the operating pattern includes a time interval to open an electronic valve. In some embodiments, the operating pattern includes a time interval and a specific time to open an electronic valve. In some embodiments, the operating pattern includes a plurality of time intervals to open an electronic valve and a plurality of time intervals to close the electronic valve.

In some embodiments, faucet command generator 224 can process the command received from NLP server 202 to determine whether one of modes 230 is being requested. For example, faucet command generator 224 may query a table storing mappings between modes 230 and operating patterns based on one or more parameters in the command. If faucet command generator 224 finds a mode, faucet command generator 224 may retrieve one or more operating patterns associated with that mode. Then, faucet command generator 224 may generate the faucet command to include the retrieved one or more operating patterns. In some embodiments, the faucet command includes information indicating one of modes 230 being selected. As described above, a mode may specify whether one or more sensors (e.g., touch sensor 128A or measurement sensors 126A) are enabled or disabled. In some embodiments, the faucet command may directly enable or disable one or more sensors.

In some embodiments, as described with respect to FIG. 1, upon generating the faucet command for the first faucet, faucet command generator 224 can be configured to transmit the faucet command to a faucet controller associated with the first faucet. In some embodiments, faucet command generator 224 can query faucets 234 to determine a controller identifier, such as an IP address, to transmit the faucet command to the faucet controller.

Figure 3:
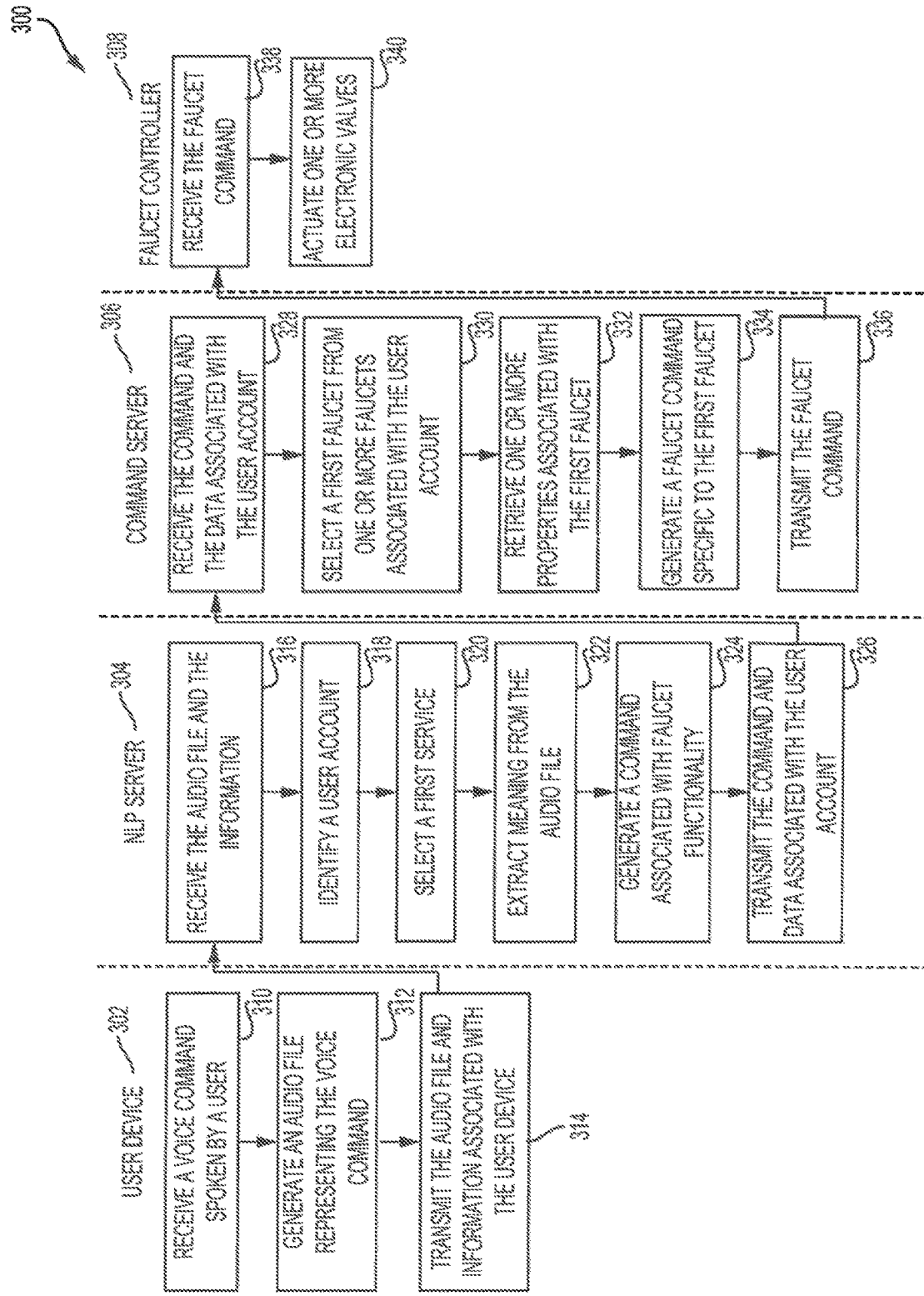
FIG. 3 illustrates a system for providing voice-controlled faucets in accordance with some embodiments.

FIG. 3 illustrates a system 300 for providing voice-controlled faucets that may apply to system 100 shown in FIG. 1, according to some embodiments. User device 302 may correspond to one of user devices 130. NLP server 304 may correspond to NLP server 112. Command server 306 may correspond to command server 114. Faucet controller 308 may correspond to one of faucet controllers 120A or 120B.

In step 310, user device 302 receives a voice command spoken by a user. For example, user device 302 may include a microphone for detecting audio signals such as the user's voice command. In step 312, user device 302 generates audio data representing the voice command. In step 314, user device 302 transmits the audio data and information associated with user device 302. In some embodiments, the information may include an Internet Protocol (IP) address, a user device ID, or data specifying a user account associated with user device 302 or the user.

In step 316, NLP server 304 receives the audio data and the information associated with user device 302. In step 318, NLP server 304 identifies a user account based on the information. In step 320, NLP server 304 selects a faucet service from a plurality of services associated with the user account. For example, user account may be associated with a thermostat service, a faucet control service, a music playing service, among other types of services. Based on information contained in the audio data, NLP server 304 may determine that the faucet control service should be selected. In some embodiments, NLP server 304 may implement a service selector, such as service selector 208 of FIG. 2, to select the first faucet.

In step 322, NLP server 304 extracts meaning from the audio data. In some embodiments, NLP server 304 implements a speech recognition (SR) engine, such as SR engine 204 described with respect to FIG. 2, to recognize speech in the audio data. For example, the SR engine may transcribe the audio data into a text stream. In some embodiments, a natural language understanding (NLU) engine, such as NLU engine 206, can extract meaning from the text stream. In some embodiments, embodiments, the NLU engine can extract meaning from the audio data directly.

In step 324, NLP server 304 generates a command associated with faucet functionality based on the extracted meaning. In some embodiments, a voice command parser, such as voice command parser 210, generates the command to include one or more parameters. In some embodiments, the one or more parameters may include, without limitation, one or more of the following: one or more flow rates, a range of flow rates, an amount of fluid, a type, a temperature, a mode, a time, a time interval, a specific time (e.g., a time of day and/or date), a faucet indicator, or a faucet mode. In step 326, NLP server 304 transmits the command and data associated with the user account to command server 306.

In step 328, command server 306 receives, from NLP server 304, the data associated with the user account and the command associated with faucet functionality.

In step 330, command server 306 selects a first faucet from one or more faucets associated with the user account. In some embodiments, a faucet selector, such as faucet selector 222 in command sever 220, can query a user account database, such as user account database 232, to determine the one or more faucets associated with the user account. For example, the faucet selector may determine that the user account is associated with two faucets. In some embodiments, the faucet selector can analyze the command to select the first faucet. For example, the command may include a parameter associated with a faucet indicator. In some embodiments, the user account database includes a table of mappings between the one or more faucets and corresponding one or more faucet indicators. In these embodiments, the faucet selector may query the table of mappings based on the faucet indicator to select the first faucet.

In step 332, a faucet command generator in command server 306, such as faucet command generator 224, retrieves one or more properties associated with the first faucet. In some embodiments, the properties can specify a first electronic valve that is coupled to the first faucet and characteristics of that first electronic valve. In some embodiments, the properties can specify a plurality of electronic valves that is coupled to the first faucet and characteristics of each electronic valve. In some embodiments, the properties for the first electronic valve can include one or more of the following: a one or more flow rates, a range of flow rates, a flow factor, a type of fluid dispensed, or a type of the first electronic valve, and the like. For example, the type of fluid dispensed may include, without limitation, cold water, hot water, a type of beverage, tea, coffee, liquid hand soap, dish washing detergent, bathroom cleaner, etc. For example, the type of the first electronic valve may include, without limitation, a solenoid valve, a double solenoid valve, a pump valve, a pressure-controlled valve, needle valve, cylinder valve, proportional solenoid valve, disc valve, and the like.

In step 334, command server 306 generates a faucet command specific to the first faucet based on the properties and the command. In some embodiments, command server 306 implements the faucet command generator 224 to generate the faucet command.

In some embodiments, the faucet command includes whether to actuate a first electronic valve coupled to the first faucet. In some embodiments, the faucet command includes an operating pattern for each electronic valves coupled to the first faucet. As described with respect to FIG. 2, the operating pattern for a first electronic valve may include a time interval to open the first electronic valve, according to some embodiments. In some embodiments, the operating pattern for the first electronic valve may include a first plurality of time intervals to open the first electronic valve and a second plurality of time intervals to close the first electronic valve. In some embodiments, the first and second plurality of time intervals can be intermixed to control a flow rate of fluid dispensed by the first electronic valve. In some embodiments, the operating pattern includes a specific time to open the first electronic valve. For example, the first electronic valve may control water flow from a shower faucet. With the capability to indicate a time to open the first electronic valve, the user may issue voice commands such as "start my shower at 8:00 AM."

In some embodiments, the command can include one or more parameters specifying an amount of a fluid to dispense. For example, the parameter may be associated with dispensing a cup of soda. Based on the one or more parameters, command server 306 may determine that the first electronic valve, for example, is associated with dispending soda and should be actuated. Then, command server 306 may generate an operating pattern for the first electronic valve by converting the amount to a time interval based on the properties of the first electronic valve. For example, an electronic valve with a higher flow rate would have a smaller time interval to dispense the requested amount of a cup of soda.

In some embodiments, the faucet command generated by the faucet command generator includes a mode selected from a plurality of modes (e.g., modes 230 of FIG. 2) associated with the first faucet. In some embodiments, the faucet command generator may determine the plurality of modes based on the parameters of the command received in step 328, the selection of the first faucet in step 330, the one or more properties of the first faucet retrieved in step 332, or a combination thereof.

In step 336, command server 306 transmits the faucet command to faucet controller 308 associated with the first faucet. In some embodiments, command server 306 retrieves an internet protocol (IP) address associated with the first faucet and the IP address corresponds to faucet controller 308.

In step 338, faucet controller 308 receives the faucet command. In step 340, faucet controller 310 actuates one or more electronic valves based on the faucet command to control the first faucet to operate according to the voice command.

Figure 4:
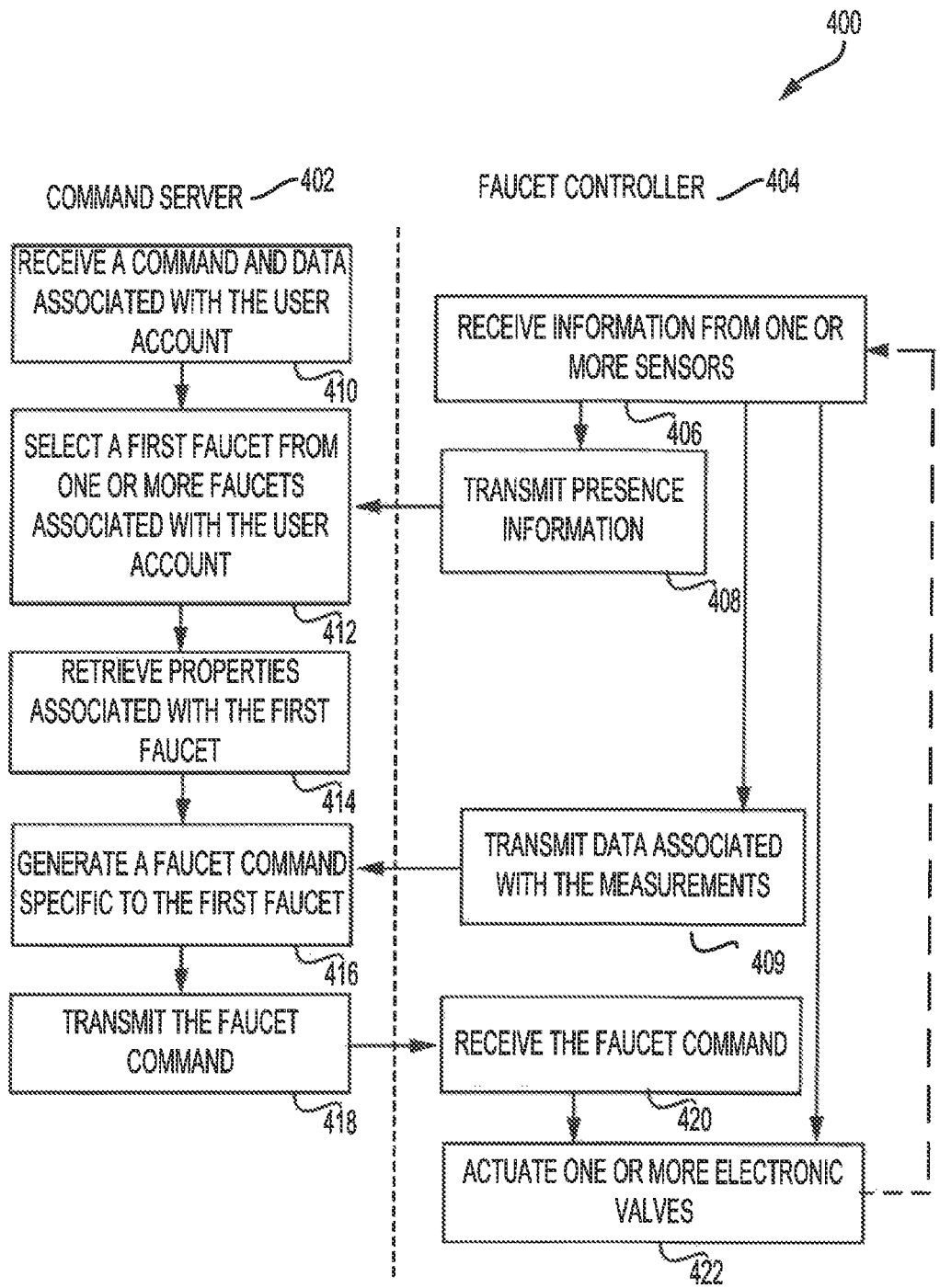
FIG. 4 illustrates a system for providing voice-controlled faucets in accordance with some embodiments.

FIG. 4 illustrates a system 400 for providing voice-controlled faucets, according to some embodiments. Command server 402 and faucet controller 404 may correspond to command server 114 and one of faucet controllers 120A or 120B, respectively. In some embodiments, method 400 expands upon the capabilities of command server 306, as described with respect to FIG. 3. In particular, as will be described below, command server 402 may receive feedback from one or more sensors installed at a first faucet to increase the accuracy in determining which faucet the user wishes to operate in a voice command. Further, the one or more sensors can be installed at the faucet to enable command server 402 and faucet controller 404 to increase the types of voice commands that a user can speak to operate voice-controlled faucets.

In step 406, faucet controller 404 receives information from one or more sensors. In some embodiments, the one or more sensors can be communicatively coupled, via a wired or wireless connection, to the faucet controller. In some embodiments, the one or more sensors can be measurement sensors (e.g., measurement sensors 126A and 126B of FIG. 1) located in close proximity to the first faucet and that measure various characteristics of the first faucet. For example, as described with respect to FIG. 1, the one or more measurement sensors may include, without limitation, a flow rate sensor, a temperature sensor, a drain sensor, and the like. Additionally, the one or more measurement sensors may include a presence sensor for detecting ambient conditions around the first faucet. Additionally, the one or more measurement sensors may detect a status of one or more mechanical devices (e.g., mechanical devices 123A of FIG. 1). For example, the status of a handle (i.e., an example of a mechanical device) may be an amount of rotation associated with a temperature of the fluid to be dispensed.

In some embodiments, faucet controller 404 repeatedly receives information from the one or more measurement sensors. For example, faucet controller 404 may periodically or on request access measurements being taken by the one or more sensors. In some embodiments, faucet controller 404 performs step 406 repeatedly and in concurrence with or after one or more of steps 408, 409, 420, and 422.

In some embodiments, the one or more sensors may include a touch sensor (e.g., touch sensor 128A of FIG. 1) that allows the user to input non-voice commands to control an operation of the first faucet. For example, the user may adjust an amount of fluid or a type of fluid to be dispensed via a touch sensor such as a touch screen.

In step 408, faucet controller 404 transmits presence information to command server 402. In some embodiments, the presence information may include measurements taken by a presence sensor or one or more presence indicators generated by the presence sensor. In some embodiments, the presence measurements or the presence indicators can indicate that the user is within a threshold distance of the first faucet where the threshold distance may be an operating range of the presence sensor. For example, the presence sensor may be a light sensor or an infrared (IR) sensor that detects whether a user is located in close proximity to the faucet being controlled by faucet controller 404.

In step 409, faucet controller 404 transmits, to command server 402, data associated with the measurements from the one or more sensors. In some embodiments, the data include information associated with one or more of a fluid presence, whether a basin is full, a flow rate, a temperature, pressure of the basin, a valve state, and the like. In some embodiments, the data include the measurements. In other embodiments, the data includes indication information derived from the measurements. In some embodiments, faucet controller 404 can also transmit any user inputs received by a touch sensor in step 406.

In step 410, command server 402 receives a command and data associated with a user account from a NLP server, such as NLP server 304. Step 410 may correspond to step 328 in method 300 of FIG. 3. As described with respect to method 300, the command may include one or more parameters associated with a voice command spoken by the user to control the first faucet coupled to faucet controller 404.

In step 412, command server 412 selects the first faucet from one or more faucets associated with the user account. In some embodiments, command server 402 may user presence information received from one or more faucet controllers, such as faucet controller 404, to determine which of the one or more faucets to select. For example, the user may have two voice-controlled faucets at his house. These two voice-controlled faucets may be associated with the user's account. In this example, command server 412 may receive presence information indicating that the user is in close proximity to the first faucet and not the second faucet. Therefore, in step 412, command server 402 may determine that the voice command spoken by the user is intended for the first faucet.

In step 414, command server 402 retrieves properties associated with the first faucet. As described with respect to step 332 of FIG. 3, the properties may include properties of one or more valves coupled to the first faucet and include, for example, a flow rate range.

In step 416, command server 402 generates a faucet command specific to the first faucet to control the first faucet according to the user's voice command. As described with respect to step 334 of FIG. 3, command server 402 can generate the faucet command based on the properties of the first faucet and the command received from the NLP server. In some embodiments, command server 402 can generate the faucet command based on the sensor measurements transmitted from faucet controller 409 to command server 402 in step 409. In some embodiments, command server 402 may periodically receive the sensor measurements from faucet controller 404. In some embodiments, in step 416, command server 402 may request faucet controller 404 to transmit the measurements.

In some embodiments, as described above with respect to step 409, command server 402 may receive sensor measurements or touch-based user inputs after or while generating the faucet command. Command server 402 may analyze the sensor measurements or any received touch-based user inputs to determine whether to update the faucet command. In some embodiments, command server 402 can update the first faucet command based on the sensor measurements to control the first electronic valve to fulfill the user's voice command.

In step 418, command server 402 transmits the faucet command to faucet controller 404. As described with respect to method 300 of FIG. 3, the faucet command may include an operating pattern for each of one or more electronic valves coupled to faucet controller 404. For example, the user's voice command may be "give me a cup of cold water" and the operating pattern may instruct faucet controller 404 to open a first electronic valve for 5 seconds to dispense the cup of cold water being vocally requested by the user.

In some embodiments, as described above with respect to steps 409 and 416, command server 402 may receive measurements from one or more sensors associated with the first faucet after the faucet command is transmitted to faucet controller 404. Similar to step 416, command server 402 can analyze the received measurements to determine whether the faucet command should be updated. In some embodiments, command server 402 generates a second faucet command for transmitting to faucet controller 404. The second faucet command may include modifications to a first faucet command generated in step 416.

In step 420, faucet controller 404 receives the faucet command from command server 402. In step 422, faucet controller 404 actuates the one or more electronic valves coupled to faucet controller 404 based on the faucet command.

In some embodiments, faucet controller 404 can actuate the one or more electronic valves based on the faucet command and the measurements of one or more sensors, as described in step 406. For example, the faucet command may include an operating pattern to turn on a first electronic valve to dispense cold water without specifying an end time or a time interval. While the first faucet is dispensing cold water, a water presence sensor or a pressure sensor installed at the first faucet may continuously monitor whether a basin is full. If the measurements indicate that the basin is full, faucet controller 404 may close the one or more electronic valve to prevent cold water from over spilling. Accordingly, the dynamic feedback provided by the one or more sensors at the first faucet enables additional voice commands such as "fill my bath tub." Therefore, in some embodiments, faucet controller 404 can actuate the one or more electronic valves according to the faucet command and adjust the actuation according to the measurements received from the one or more sensors.

In some embodiments, faucet controller 404 can be configured to override processing of the measurements of the one or more sensors based on the received voice command. For example, as described above with respect to FIG. 1, a measurement of the one or more sensors may include a detected status of a mechanical device such as a knob or a handle for operating the first faucet. In this example, the mechanical device may be actuated in a position to indicate a first temperature of the dispensed liquid and faucet controller 404 may be configured to control the first faucet to dispense liquid at a second temperature specified in the received voice command regardless of the position of the mechanical device.

In some embodiments, faucet controller 404 can actuate the one or more electronic valves based on the faucet command, the measurements of one or more sensors, and user inputs received by a touch sensor, as described above in step 406. For example, faucet controller 404 may actuate the one or more electronic valves to dispense 50 mL of cold water. While dispensing the cold water, faucet controller 404 may receive user input indicating the addition of 40 mL of cold water. In response, faucet controller 404 may dispense additional cold water.

In some embodiments, the faucet command received in step 420 may be a first faucet command. While faucet controller 404 is actuating the one or more electronic valves according to the first faucet command, faucet controller 404 may receive a second faucet command. In these embodiments, faucet controller 404 can discard the first faucet command and actuate the one or more electronic valves according to the second faucet command.

Figure 5:
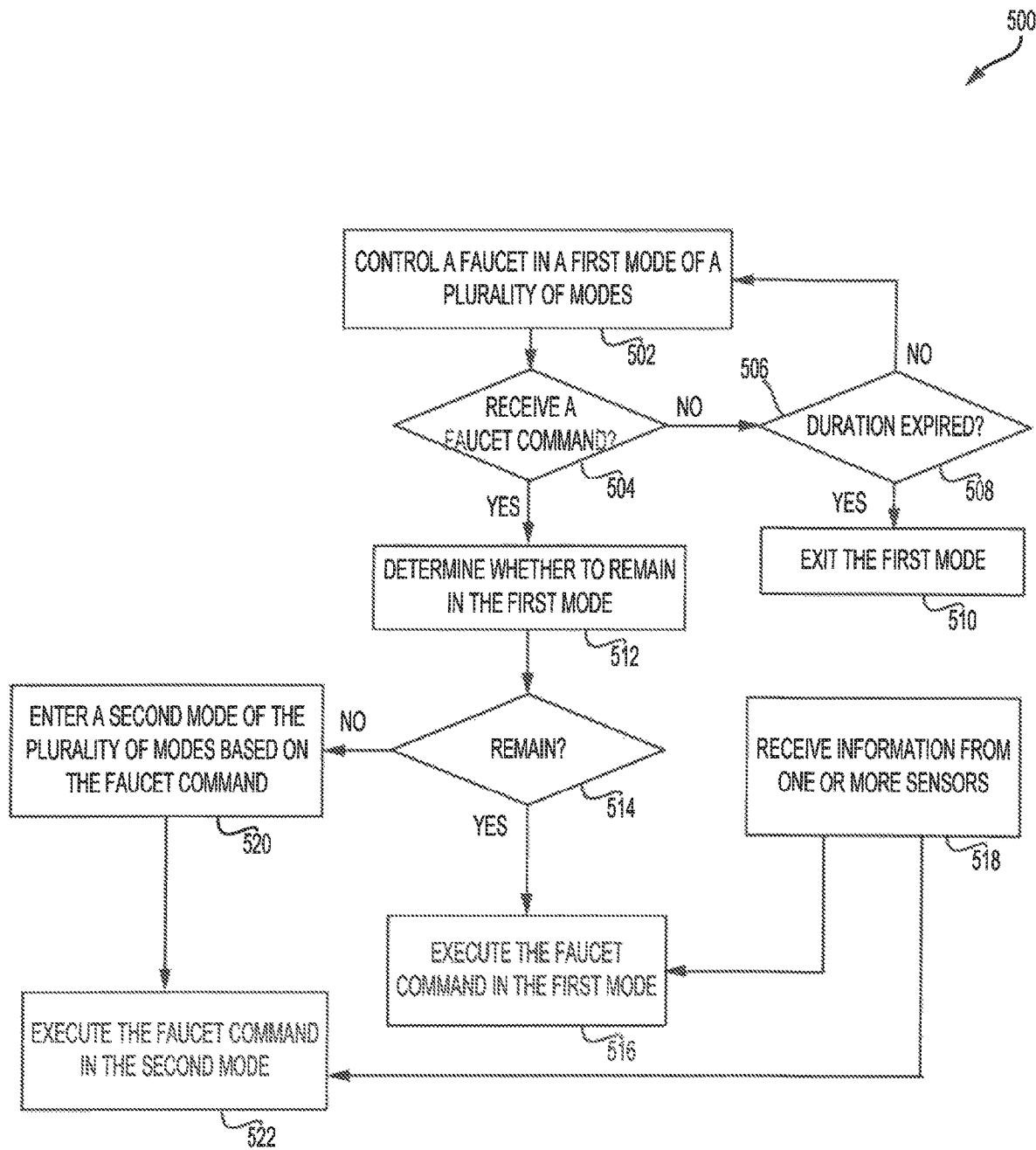
FIG. 5 illustrates a system for operating a faucet according to a plurality of modes in accordance with some embodiments.

FIG. 5 illustrates a system 500 for operating a faucet according to a plurality of modes in accordance with some embodiments. In some embodiments, method 400 can be performed by a faucet controller, such as faucet controller 120A of FIG. 1. As described above with respect to FIG. 2, the faucet may be a voice-controlled faucet that is controlled according to a plurality of modes. In some embodiments, each mode of the plurality of modes can be associated with one or more settings that control a characteristic of fluid dispensed by the faucet or how additional commands or non-voice inputs are to be processed by the faucet controller.

In step 502, a faucet controller controls the faucet in a first mode of a plurality of modes. In some embodiments, the faucet controller may have previously entered the first mode in response to receiving and processing one or more faucet commands transmitted by a command server, such as command server 114 of FIG. 1. In some embodiments, the faucet controller may have entered the first mode in response to a local command, for instance a command from a touch input sensor, a presence sensor, a mechanical cartridge, an electronic cartridge, etc.

In some embodiments, the first mode may be a default mode associated with a plurality of default settings. For example, the default settings may include characteristics of a fluid being dispensed by the faucet such as non-filtered, cold water. In another example, the default settings may include a lowest priority that allows the first mode to be overridden by any other mode.

In step 504, the faucet controller determines whether a faucet command is received from the command server. If so, method 500 proceeds to step 512. Otherwise, method 500 proceeds to step 506.

In step 506, the faucet controller determines whether the first mode is associated with a duration that has expired. If the faucet controller determines that the duration has not expired, method 500 returns to step 502 where the faucet controller continues to control the behavior of the faucet in the first mode. In some embodiments, the first mode may not be associated with any duration of time that specifies a time to remain the first mode. In these embodiments, method 500 similarly returns to step 502. If the faucet controller determines that the duration has expired, method 500 proceeds to step 510.

In step 510, the faucet controller exits the first mode because a predefined duration of time associated with the first mode has expired. In some embodiments, the faucet controller enters a default mode.

In step 512, the faucet controller determines whether to remain in the first mode. In some embodiments, the faucet controller may be configured to always enter a mode associated with the faucet command received in step 504. Therefore, the faucet controller may remain in the first mode if the received faucet command of step 504 is associated with the first mode.

In some embodiments, the mode associated with the faucet command may include an indicator that specifies whether that mode overrides previous modes, such as the currently operating first mode. In embodiments where the mode overrides the first mode, the faucet controller can override a previous faucet command. For example, the faucet may be dispensing cold filtered water in a filtered water mode, an example of the first mode. The faucet command may specify, for example, a dishwashing mode that may override the filtered water mode. In this example, the dishwashing mode may override various fluid characteristics such as a temperature or a filtration setting associated with the filtered water mode. In some embodiments, certain modes may be configured to override certain other modes, such that characteristics associated with pre-applied modes may no longer be applied once the overriding mode is activated. In some embodiments, certain modes may be configured not to override certain other modes, such that characteristics associated with pre-applied modes may continue to be applied after the non-overriding mode is selected; in some embodiments, the non-overriding mode may not be activated at all (e.g., if a pre-selected mode has higher priority or itself overrides the new mode) or may be activated simultaneously with the pre-applied modes, such that characteristics from both modes may be applied at the same time.

In some embodiments, the faucet controller determines whether to remain in the first mode by comparing respective priority levels of the first mode and a second mode associated with the faucet command received in step 504. For example, the first mode may have a first priority level and the second mode may have a second priority level. If the first priority level is higher than the second priority level, the faucet controller may determine to remain in the first mode.

In step 514, if the faucet controller determines to remain in the first mode, method 500 proceeds to step 516. Otherwise, method 500 proceeds to step 520.

In step 518, the faucet controller receives information from one or more sensors. In some embodiments, step 518 may correspond to step 406, as described with respect to FIG. 4. In some embodiments, the one or more sensors may include measurement sensors (e.g., measurement sensors 126A of FIG. 1) or a touch sensor (e.g., touch sensor 128A of FIG. 1).

In step 516, the faucet controller executes the faucet command (received in step 504) in the first mode. In some embodiments, step 516 may correspond to step 422 of FIG. 4. Like in step 422, the faucet controller may be configured to actuate one or more electronic values according to the faucet command. Additionally, the faucet controller may adjust or halt execution of the faucet command based on the sensor information received in step 518 and based on a plurality of settings specified in the first mode, according to some embodiments. For example, if the first mode is a child lock mode, the faucet controller may ignore any user inputs received by a touch sensor.

In step 520, the faucet controller enters a second mode of the plurality of modes based on the faucet command. For example, the faucet controller may select the second mode based on an indication of the second mode in the faucet command. In some embodiments, the faucet command includes an indication of the second mode.

In step 522, the faucet controller executes the faucet command (received in step 504) in the second mode. In some embodiments, step 522 may correspond to step 422 of FIG. 4. Like in step 422, the faucet controller may be configured to actuate one or more electronic values according to the faucet command. Additionally, the faucet controller may adjust or halt execution of the faucet command based on the sensor information received in step 518 and based on a plurality of settings specified in the second mode, according to some embodiments.

Figure 6:
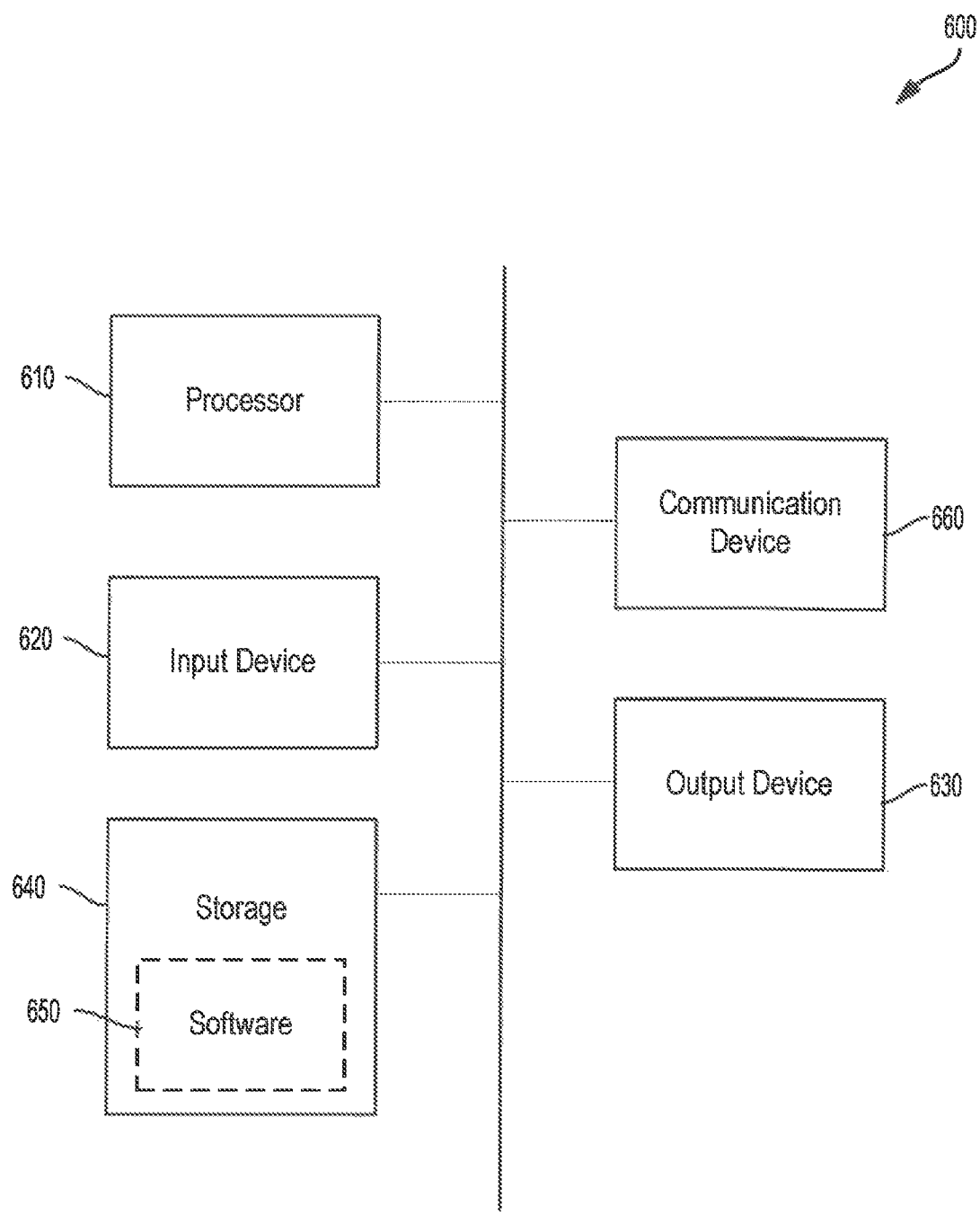
FIG. 6 illustrates a functional block diagram of a computer in accordance with some embodiments.

FIG. 6 illustrates an example of a computer in accordance with some embodiments. Computer 600 can be a component of a system for providing voice-controlled faucets, such as system 100 described above with respect to FIG. 1. In some embodiments, computer 600 is configured to execute a method for providing a voice-controlled faucet, such as all or part of methods 300, 400, or 500 of FIG. 3, FIG. 4, and FIG. 5, respectively.

Computer 600 can be a host computer connected to a network. Computer 600 can be a client computer or a server. As shown in FIG. 6, computer 600 can be any suitable type of microprocessor-based device, such as a personal computer; workstation; server; or handheld computing device, such as a phone or tablet. The computer can include, for example, one or more of processor 610, input device 620, output device 630, storage 640, and communication device 660.

Input device 620 can be any suitable device that provides input, such as a touch screen or monitor, keyboard, mouse, or voice-recognition device. Output device 630 can be any suitable device that provides output, such as a touch screen, monitor, printer, disk drive, or speaker.

Storage 640 can be any suitable device that provides storage, such as an electrical, magnetic, or optical memory, including a RAM, cache, hard drive, CD-ROM drive, tape drive, or removable storage disk. Communication device 660 can include any suitable device capable of transmitting and receiving signals over a network, such as a network interface chip or card. The components of the computer can be connected in any suitable manner, such as via a physical bus or wirelessly. Storage 640 can be a non-transitory computer-readable storage medium comprising one or more programs, which, when executed by one or more processors, such as processor 610, cause the one or more processors to execute methods described herein, such as all or part of methods 300, 400, or 500 described with respect to FIG. 3, FIG. 4, and FIG. 5, respectively.

Software 650, which can be stored in storage 640 and executed by processor 610, can include, for example, the programming that embodies the functionality of the present disclosure (e.g., as embodied in the systems, computers, servers, and/or devices as described above). In some embodiments, software 650 can be implemented and executed on a combination of servers such as application servers and database servers.

Software 650 can also be stored and/or transported within any computer-readable storage medium for use by or in connection with an instruction execution system, apparatus, or device, such as those described above, that can fetch and execute instructions associated with the software from the instruction execution system, apparatus, or device. In the context of this disclosure, a computer-readable storage medium can be any medium, such as storage 640, that can contain or store programming for use by or in connection with an instruction execution system, apparatus, or device.

Software 650 can also be propagated within any transport medium for use by or in connection with an instruction execution system, apparatus, or device, such as those described above, that can fetch and execute instructions associated with the software from the instruction execution system, apparatus, or device. In the context of this disclosure, a transport medium can be any medium that can communicate, propagate, or transport programming for use by or in connection with an instruction execution system, apparatus, or device. The transport-readable medium can include, but is not limited to, an electronic, magnetic, optical, electromagnetic, or infrared wired or wireless propagation medium.

Computer 600 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Computer 600 can implement any operating system suitable for operating on the network. Software 650 can be written in any suitable programming language, such as C, C++, Java, or Python. In various embodiments, application software embodying the functionality of the present disclosure can be deployed in different configurations, such as in a client/server arrangement or through a Web browser as a Web-based application or Web service, for example.

In some embodiments, a mode may include a maintenance mode or a measured dispensing mode. When in a maintenance mode, the system may override any voice-based command or touch input. In some embodiments, when in a measured dispensing mode, another mode may be overridden and certain electronic valves closed.

In some embodiments, the user may operate mechanical devices to override any faucet command being executed by a faucet controller. For example, a voice-generated faucet command may be overridden when a user operates an electronic cartridge handle. A voice-generated faucet command may be overridden when a flow sensor detects that a mechanical mixing cartridge is being operated by a user.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying figures, it is to be noted that various changes and modifications will become apparent to those skilled in the art. Such changes and modifications are to be understood as being included within the scope of the disclosure and examples as defined by the claims. Finally, the entire disclosure of the patents and publications referred to in this application are hereby incorporated herein by reference.

The articles "a" and "an" herein refer to one or to more than one (e.g. at least one) of the grammatical object. Any ranges cited herein are inclusive. The term "about" used throughout is used to describe and account for small fluctuations. For instance, "about" may mean the numeric value may be modified by ±0.05%, ±0.1%, ±0.2%, ±0.3%, ±0.4%, ±0.5%, ±1%, ±2%, ±3%, ±4%, ±5%, ±6%, ±7%, ±8%, ±9%, ±10% or more. All numeric values are modified by the term "about" whether or not explicitly indicated. Numeric values modified by the term "about" include the specific identified value. For example "about 5.0" includes 5.0.

The term "coupled" means that an element or feature is "attached to" or "associated with" another element or feature. Coupled may mean directly coupled or coupled through one or more other elements. An element may be coupled to an element through two or more other elements in a sequential manner or a non-sequential manner. Coupled or "associated with" may also mean elements not directly or indirectly attached, but that they "go together" in that one may function together with the other.

Following are some non-limiting embodiments of the invention.

In a first embodiment, disclosed is a faucet system comprising a faucet; an electronic valve associated with the faucet; and a faucet controller associated with the electronic valve; wherein the faucet controller is configured to receive a faucet command from a command server; and actuate the electronic valve upon receiving the faucet command; wherein the command server is configured to receive a speech-based command from a natural language processing (NLP) server; generate the faucet command from the speech-based command and transmit the faucet command to the faucet controller; and wherein the NLP server is remote to the faucet.

In a second embodiment, disclosed is a faucet system according to the first embodiment, wherein a user device is configured to receive a voice command from a user; and transmit audio data based on the voice command to the NLP server; and wherein the NLP server is configured to receive the audio data from the user device; recognize speech from the audio data; generate the speech-based command; and transmit the speech-based command to the command server.

In a third embodiment, disclosed is a faucet system according to the first or second embodiments, wherein the user device is configured to transmit information associated with the user device and the audio data based on the voice command to the NLP server.

In a fourth embodiment, disclosed is a faucet system according to any of the preceding embodiments, wherein the NLP server is configured to receive information associated with the user device and the audio data from the user device; identify a user account associated with the user based on the information; select a faucet service from a plurality of services associated with the user account based on determining that the speech is associated with a faucet function; transmit the speech-based command and data indicating the user account to the command server; and wherein the command server is configured to receive the speech-based command and the data indicating the user account from the NLP server; select a faucet from one or more faucets associated with the user account; generate a faucet command specific to the faucet based on one or more properties of the faucet and the speech-based command; and transmit the faucet command to the faucet controller.

In a fifth embodiment, disclosed is a faucet system according to any of the preceding embodiments, wherein the command server is configured to retrieve one or more properties associated with the electronic valve from a database. In a sixth embodiment, disclosed is a faucet system according to any of the preceding embodiments, wherein the faucet system comprises a presence sensor configured to indicate that a user is within a threshold distance of the faucet and to transmit the indication to the faucet controller; the faucet controller is configured to transmit the indication to the command server; and the command server is configured to select the faucet based on the indication.

In a seventh embodiment, disclosed is a faucet system according to any of the preceding embodiments, wherein the speech-based command comprises one or more parameters selected from a group consisting of flow rate, amount of fluid, temperature, time interval, time, a faucet indicator or a faucet mode.

In an eighth embodiment, disclosed is a faucet system according to any of the preceding embodiments, wherein the faucet command comprises an operating pattern of the electronic valve. In a ninth embodiment, disclosed is a faucet system according to any of the preceding embodiments, wherein the faucet command comprises an operating pattern of the electronic valve, wherein the operating pattern comprises a time interval to open the electronic valve.

In a tenth embodiment, disclosed is a faucet system according to any of the preceding embodiments, wherein the speech-based command comprises a parameter specifying an amount of fluid to dispense, and wherein the command server is configured to determine an operating pattern based on the amount of fluid and properties of the faucet.

In an eleventh embodiment, disclosed is a faucet system according to any of the preceding embodiments, wherein the faucet command comprises an operating pattern comprising a plurality of time intervals to open the electronic valve and a plurality of time intervals to close the electronic valve.

In a twelfth embodiment, disclosed is a faucet system according to any of the preceding embodiments, wherein the faucet properties comprise one or more of a flow rate, a flow factor, a number of valves, a type of fluid dispensed, a type of each of the valves or a type of faucet. In a thirteenth embodiment, disclosed is a faucet system according to any of the preceding embodiments, wherein the speech-based command comprises a faucet indicator associated with the faucet, and the command server is configured to query a table of mappings between one or more faucets and corresponding one or more faucet indicators to select the faucet.

In a fourteenth embodiment, disclosed is a faucet system according to any of the preceding embodiments, wherein the command server is configured to determine the faucet is coupled to a first electronic valve and to a second electronic valve; the first electronic valve controls a flow of fluid at a first temperature and the second electronic valve controls flow of fluid at a second temperature; and the faucet command comprises a first operating pattern for the first electronic valve and a second operating pattern for the second electronic valve.

In a fifteenth embodiment, disclosed is a faucet system according to any of the preceding embodiments, wherein the speech-based command specifies a temperature spoken by the user in the voice command, and wherein the faucet command comprises a first operating pattern and a second operating pattern to control the faucet to provide fluid at the temperature. In a sixteenth embodiment, disclosed is a faucet system according to any of the preceding embodiments, wherein the faucet controller is configured to receive a measurement from one or more sensors located proximate to the faucet and to transmit the measurement to the command server; and wherein the command server is configured to generate a faucet command in accordance with the measurement. Alternatively, the command server is configured to instruct the faucet system to enter a certain mode in response to input from one or more sensors.

In a seventeenth embodiment, disclosed is a faucet system according to any of the preceding embodiments, wherein the one or more sensors are selected from a group consisting of capacitive sensors, touch sensors, flow sensors, temperature sensors, presence sensors, infrared sensors, light sensors and pressure sensors. In an eighteenth embodiment, disclosed is a faucet system according to any of the preceding embodiments, wherein the speech-based command comprises a parameter specifying a faucet mode, and the command server is configured to query a database of faucet modes based on the faucet mode to determine an operating pattern of the electronic valve.

In a nineteenth embodiment, disclosed is a faucet system according to any of the preceding embodiments, wherein the database stores a quantity of fluid to dispense for the faucet mode, and wherein the operating pattern comprises a time interval to open the electronic valve to dispense the quantity of fluid.

In a twentieth embodiment, disclosed is a faucet system according to any of the preceding embodiments, wherein the database stores a time duration for the faucet mode, and wherein the operating pattern comprises the time duration to open the electronic valve.

In a twenty-first embodiment, disclosed is a faucet system according to any of the preceding embodiments, wherein the speech-based command is associated with a mode comprising one or more settings for operating the faucet, and wherein the faucet controller is configured to actuate the electronic valve to control the faucet in accordance with the one or more settings.

In a twenty-second embodiment, disclosed is a faucet system according to any of the preceding embodiments, wherein the one or more settings specify how the faucet controller responds to non-voice related inputs. In a twenty-third embodiment, disclosed is a faucet system according to any of the preceding embodiments, wherein the non-voice related inputs comprise an input from at least one of a touch sensor or a mechanical device for operating the faucet. In a twenty-fourth embodiment, disclosed is a faucet system according to any of the preceding embodiments, wherein the non-voice related inputs comprise an input from one or more of an IR sensor, a light sensor, a radar sensor, a gesture sensor, a short or mid-range capacitive field sensor.

Following are some more embodiments of the invention.

In a first embodiment, disclosed is a faucet system comprising a faucet; an electronic valve associated with the faucet; and a faucet controller associated with the electronic valve; wherein the faucet controller is configured to receive a faucet command from a command server; and actuate the electronic valve upon receiving the faucet command; wherein the command server is configured to receive a speech-based command from a natural language processing (NLP) server; generate the faucet command from the speech-based command and transmit the faucet command to the faucet controller; and wherein the NLP server is remote to the faucet.

In a second embodiment, disclosed is a faucet system according to the first embodiment, wherein a user device is configured to receive a voice command from a user; and transmit audio data based on the voice command to the NLP server; and wherein the NLP server is configured to receive the audio data from the user device; recognize speech from the audio data; generate the speech-based command; and transmit the speech-based command to the command server.

In a third embodiment, disclosed is a faucet system according to the first or second embodiments, wherein a user device is configured to transmit information associated with the user device and the audio data based on the voice command to the NLP server.

In a fourth embodiment, disclosed is a faucet system according to any of the preceding embodiments, wherein the NLP server is configured to receive information associated with the user device and the audio data from the user device; identify a user account associated with the user based on the information; select a faucet service from a plurality of services associated with the user account based on determining that the speech is associated with a faucet function; transmit the speech-based command and data indicating the user account to the command server; and wherein the command server is configured to receive the speech-based command and the data indicating the user account from the NLP server; select a faucet from one or more faucets associated with the user account; generate a faucet command specific to the faucet based on one or more properties of the faucet and the speech-based command; and transmit the faucet command to the faucet controller.

In a fifth embodiment, disclosed is a faucet system according to any of the preceding embodiments, wherein the faucet system comprises one or more elements associated with the faucet and in electrical communication with the faucet controller, wherein the elements are selected from a group consisting of mechanical devices, touch sensors, measurement sensors and electronic cartridges.

In a sixth embodiment, disclosed is a faucet system according to any of the preceding embodiments, wherein the faucet system comprises one or more sensors associated with the faucet and in electrical communication with the faucet controller, wherein the sensors are selected from a group consisting of capacitive sensors, touch sensors, flow sensors, temperature sensors, presence sensors, IR sensors, light sensors, gesture sensors, radar sensors, micro-radar sensors, handle position sensors and pressure sensors.

In a seventh embodiment, disclosed is a faucet system according to any of the preceding embodiments, wherein the faucet controller is configured to receive a non-voice input. In an eighth embodiment, disclosed is a faucet system according to any of the preceding embodiments, wherein the faucet controller is configured to receive a non-voice input from the one or more elements associated with the faucet.

In a ninth embodiment, disclosed is a faucet system according to any of the preceding embodiments, wherein the faucet controller is configured to receive a non-voice input from one or more elements associated with the faucet, and wherein the faucet controller is configured to generate a local command in response thereto. In a tenth embodiment, disclosed is a faucet system according to any of the preceding embodiments, wherein the faucet controller is configured to receive a non-voice input from one or more elements associated with the faucet, and wherein the faucet controller is configured to generate a local command in response thereto, and to actuate the electronic valve in accordance with the local command.

In an eleventh embodiment, disclosed is a faucet system according to any of the preceding embodiments, wherein the faucet controller is configured to receive non-voice inputs from one or more elements associated with the faucet and to transmit the non-voice inputs to the command server. In a twelfth embodiment, the command server is configured to generate a subsequent faucet command. In a thirteenth embodiment, disclosed is a faucet system according to any of the preceding embodiments, wherein the system is configured to be in a first faucet mode of a plurality of faucet modes, and wherein the system is configured to exit the first faucet mode and to enter a second faucet mode in response to the local command and/or the speech-based command.

In a fourteenth embodiment, disclosed is a faucet system according to any of the preceding embodiments, wherein the faucet modes are selected from a group consisting of standby mode, manual control mode, quick control mode, measured dispensing mode, temperature/flow rate mode, treatment mode, hand wash mode, maintenance mode, and dishwashing mode.

In a fifteenth embodiment, disclosed is a faucet system according to any of the preceding embodiments, wherein the system is configured such that mode exit and entry is determined by the command server in response to the speech-based command and/or is determined by the faucet controller in response to a non-voice input. In a sixteenth embodiment, disclosed is a faucet system according to any of the preceding embodiments, wherein the system is configured such that mode exit and entry is determined based on a criteria selected from a group consisting of a mode priority, a most recently requested mode, a most requested mode, a mode permission to override, and a combination thereof.

In a seventeenth embodiment, disclosed is a faucet system according to any of the preceding embodiments, wherein the speech-based command comprises a parameter specifying an amount of fluid to dispense, wherein the system enters a measured dispensing mode, and wherein the faucet command comprises instructions to actuate the electronic valve to deliver a specified volume of fluid. In an eighteenth embodiment, disclosed is a faucet system according to any of the preceding embodiments, wherein the speech-based command specifies a temperature, wherein the system enters a temperature/flow rate mode, and wherein the faucet command comprises instructions to actuate a first electronic valve and a second electronic valve to deliver a fluid at a specified temperature.

In a nineteenth embodiment, disclosed is a faucet system according to any of the preceding embodiments, wherein a maintenance mode and a manual control mode have a higher priority than the other modes and wherein the other modes do not have permission to override the maintenance mode or manual control mode. In a twentieth embodiment, disclosed is a faucet system according to any of the preceding embodiments, wherein the system comprises a mechanical device associated with and in electrical communication with the faucet, and wherein upon actuation of the mechanical device, the first faucet mode is exited and a manual control mode is entered.

In a twenty-first embodiment, disclosed is a faucet system according to any of the preceding embodiments, wherein the system comprises a touch sensor associated with and in electrical communication with the faucet, and wherein upon a user operating the touch sensor, the first faucet mode is exited and a second faucet mode is entered.

In a twenty-second embodiment, disclosed is a faucet system according to any of the preceding embodiments, wherein the system comprises a presence sensor associated with and in electrical communication with the faucet, and wherein upon the presence sensor detecting a user, the first faucet mode is exited and a second faucet mode is entered.

In a twenty-third embodiment, disclosed is a faucet system according to any of the preceding embodiments, wherein the speech-based command comprises one or more parameters selected from a group consisting of flow rate, amount of fluid, temperature, time interval, time, a faucet indicator or a faucet mode. In a twenty-fourth embodiment, disclosed is a faucet system according to any of the preceding embodiments, wherein the local command comprises one or more parameters selected from a group consisting of flow rate, amount of fluid, temperature, time interval, time, a faucet indicator or a faucet mode.

In a twenty-fifth embodiment, disclosed is a faucet system according to any of the preceding embodiments, wherein the speech-based command is associated with a mode comprising one or more settings for operating the faucet, and wherein the faucet controller is configured to actuate the electronic valve to control the faucet in accordance with the one or more settings.

In a twenty-sixth embodiment, disclosed is a faucet system according to any of the preceding embodiments, wherein the local command is associated with a mode comprising one or more settings for operating the faucet, and wherein the faucet controller is configured to actuate the electronic valve to control the faucet in accordance with the one or more settings. In a twenty-seventh embodiment, disclosed is a faucet system according to any of the preceding embodiments, wherein the one or more settings specify how the faucet controller responds to non-voice input.

In a twenty-eighth embodiment, disclosed is a faucet system according to any of the preceding embodiments, wherein the faucet command comprises an operating pattern of the electronic valve. In a twenty-ninth embodiment, disclosed is a faucet system according to any of the preceding embodiments, wherein the local command comprises an operating pattern of the electronic valve.

EXAMPLES

In the following Examples, faucet system modes are prioritized from 1 (highest priority) as follows: maintenance (1); manual control (2); quick control (3); temperature/flow rate (4); treated water (5); measured dispensing (6); hand wash (7); dishwashing (8); and standby (9). Also in the following Examples faucet system modes are configured to have yes or no permission to be overridden by another mode as follows: standby (yes); manual control (no); quick control (yes); measured dispensing (yes); temperature/flow rate (yes); treated water (yes); hand wash (yes); maintenance (no); dishwashing (yes).

Example 1 Selection of Faucet System Mode Based on Mode Priority

A faucet system is in standby mode (priority 9). The faucet controller receives a voice-generated command from a command server to dispense a measured quantity of water (priority 6). The system enters the measured dispensing mode and executes the command as the priority is greater for the measured dispensing mode. Subsequently, the user operates a faucet handle (priority 2) while the faucet is in measured dispensing mode (priority 6). The system will enter the manual control mode and execute the user locally-generated command as manual control mode has higher priority than measured dispensing mode. Finally, the user closes the handle. The system exits manual control mode (2) and returns to standby mode (9). The faucet controller is ready to receive and generate new instructions.

In some embodiments, if a faucet system is directed to exit a mode without receiving new instructions, a standby mode is entered.

Example 2 Selection of Faucet System Mode Based on Mode Priority

A faucet system is in standby mode (priority 9). A user operates a touch sensor which requests the system to enter a quick control mode (priority 3). The user requests a measured quantity of fluid via a voice-generated command. The command server sends the voice-generated command to the faucet controller. The system however remains in quick control mode as the quick control mode (priority 3) has a higher priority than the measured dispensing mode (priority 6). The user operates the touch sensor which toggles out of quick control mode (priority 3), returning the system to standby mode.

Example 3 Selection of Faucet System Mode Based on Most Recent Request

A faucet system is in standby mode. A user operates a touch sensor to request the system to enter the quick control mode. The user then requests a measured quantity of fluid via a voice command. The command server generates a faucet command from the voice command and transmits it to a faucet controller. The system enters a measured dispensing mode. The faucet controller actuates an electronic valve accordingly. The requested quantity of fluid is dispensed by the faucet fulfilling the voice-generated command. The system returns to standby mode.

Example 4 Selection of Faucet System Mode Based on Most Recent Request

A faucet system is in standby mode. A user requests a measured quantity of fluid via a voice command. The command server generates a faucet command from the voice command. The system enters a measured dispensing mode. Subsequently, the user operates a faucet handle while the faucet is in the measured dispensing mode. A local sensor is associated with the handle and communicates handle operation to the faucet controller. The faucet controller instructs the system to override the measured dispensing mode and enter the manual control mode. The faucet system executes the locally-generated command. The user then operates a touch sensor which clears the manual control mode. The system reverts to standby mode.

Example 5 Selection of Faucet System Mode Based on Override Permission

A faucet system is in standby mode. A user requests a measured quantity of fluid via a voice command. The faucet controller receives a faucet command from a command server. The system enters measured dispensing mode. Subsequently, the user operates a faucet handle. The handle is associated with a local sensor which communicates the information to the faucet controller. The faucet system exits measured dispensing mode and enters manual control mode. The faucet controller will actuate an electronic valve in accordance with the handle position. The measured dispensing mode allows for manual override. The user then operates a touch sensor which clears the manual control mode. The system returns to standby mode. The user may also close the handle without providing new instructions—the system will then return to standby mode.

Example 6 Selection of Faucet System Mode Based on Override Permission

A faucet system is in standby mode. A user operates a faucet handle placing the system in manual control mode. The system executes a locally-generated command accordingly. While still in manual control mode, the user requests a measured quantity of fluid via a voice command. The faucet controller receives a voice-generated faucet command from a command server. The faucet system will not enter measured quantity mode and will not execute the voice-generated command as manual control mode does not allow for override. The user closes the handle. Manual control mode is exited and standby mode is entered.

The invention claimed is:

1. A faucet system comprising
   a user device;
   a natural language processing (NLP) server;
   a command server;
   a faucet;
   an electronic valve associated with the faucet; and
   a faucet controller associated with the electronic valve,
   wherein the user device is configured to
     receive a voice command from a user; and
     transmit information associated with the user device and audio data based on the voice command to the NLP server,
   wherein the NLP server is configured to
     receive the information associated with the user device and the audio data from the user device;
     identify a user account associated with the user based on the information;
     recognize speech from the audio data;
     select a faucet service from a plurality of services associated with the user account based on determining that the speech is associated with a faucet function;
     generate a speech-based command; and
     transmit the speech-based command and data indicating the user account to the command server,
   wherein the NLP server is remote to the faucet,
   wherein the command server is configured to
     receive the speech-based command and the data indicating the user account from the NLP server;
     select a faucet from one or more faucets associated with the user account;
     generate a faucet command specific to the faucet based on one or more properties of the faucet and the speech-based command; and
     transmit the faucet command to the faucet controller,
   wherein the faucet is able to be operated remotely, and
   wherein the faucet controller is configured to
     receive the faucet command from the command server; and
     actuate the electronic valve upon receiving the faucet command,
   wherein the faucet controller is further configured to
     receive non-voice inputs from one or more elements associated with the faucet; and
     transmit the non-voice inputs to the command server, and
     wherein the command server is configured to generate a subsequent faucet command,
   wherein the command server and/or the faucet controller are configured to
     override, complement, modify, halt, or adjust one command over the other in response to the speech-based faucet command and the non-voice inputs-based subsequent faucet command based on system settings and mode priorities.

2. The faucet system according to claim 1, wherein the faucet system comprises one or more elements associated with the faucet and in electrical communication with the faucet controller, wherein the elements are selected from a group consisting of mechanical devices, touch sensors, measurement sensors and electronic cartridges.

3. The faucet system according to claim 2, wherein the faucet controller is configured to receive a non-voice input from one or more elements associated with the faucet, and wherein the faucet controller is configured to generate a local command in response thereto.

4. The faucet system according to claim 3, wherein the system is configured to be in a first faucet mode of a plurality of faucet modes, and wherein the system is configured to exit the first faucet mode and to enter a second faucet mode in response to the local command and/or the speech-based command.

5. The faucet system according to claim 4, wherein the faucet modes are selected from a group consisting of standby mode, manual control mode, quick control mode, measured dispensing mode, temperature/flow rate mode, treatment mode, hand wash mode, maintenance mode, and dishwashing mode.

6. The faucet system according to claim 4, wherein the system is configured such that mode exit and entry is determined by the command server in response to the speech-based command and/or is determined by the faucet controller in response to a non-voice input.

7. The faucet system according to claim 4, wherein the system is configured such that mode exit and entry is determined based on a criteria selected from a group consisting of a mode priority, a most recently requested mode, a most requested mode, a mode permission to override, and a combination thereof.

8. The faucet system according to claim 4, wherein the speech-based command comprises a parameter specifying an amount of fluid to dispense, wherein the system enters a measured dispensing mode, and wherein the faucet command comprises instructions to actuate the electronic valve to deliver a specified volume of fluid.

9. The faucet system according to claim 4, wherein the speech-based command specifies a temperature, wherein the system enters a temperature/flow rate mode, and wherein the faucet command comprises instructions to actuate a first electronic valve and a second electronic valve to deliver a fluid at a specified temperature.

10. The faucet system according to claim 4, wherein the system comprises a mechanical device; a touch sensor; or a presence sensor associated with and in electrical communication with the faucet, and wherein
   upon actuation of the mechanical device,
   upon a user operating the touch sensor, or
   upon the presence sensor detecting a user,
   the first faucet mode is exited and the second faucet mode is entered.

11. The faucet system according to claim 4, wherein a maintenance mode and a manual control mode have a higher priority than the other modes and wherein the other modes do not have permission to override the maintenance mode or manual control mode.

12. The faucet system according to claim 3, wherein the local command comprises one or more parameters selected from a group consisting of flow rate, amount of fluid, temperature, time interval, time, a faucet indicator or a faucet mode.

13. The faucet system according to claim 3, wherein the local command is associated with a mode comprising one or more settings for operating the faucet, and wherein the faucet controller is configured to actuate the electronic valve to control the faucet in accordance with the one or more settings.

14. The faucet system according to claim 3, wherein the local command comprises an operating pattern of the electronic valve.

15. The faucet system according to claim 2, wherein the faucet controller is configured to receive a non-voice input from one or more elements associated with the faucet, and wherein the faucet controller is configured to generate a local command in response thereto, and to actuate the electronic valve in accordance with the local command.

16. The faucet system according to claim 1, wherein the faucet system comprises one or more sensors associated with the faucet and in electrical communication with the faucet controller, wherein the sensors are selected from a group consisting of capacitive sensors, touch sensors, flow sensors, temperature sensors, presence sensors, IR sensors, light sensors, gesture sensors, radar sensors, micro-radar sensors, handle position sensors and pressure sensors.

17. The faucet system according to claim 1, wherein the speech-based command comprises one or more parameters selected from a group consisting of flow rate, amount of fluid, temperature, time interval, time, a faucet indicator or a faucet mode.

18. The faucet system according to claim 1, wherein the speech-based command is associated with a mode comprising one or more settings for operating the faucet, and wherein the faucet controller is configured to actuate the electronic valve to control the faucet in accordance with the one or more settings.

19. The faucet system according to claim 1, wherein the faucet command comprises an operating pattern of the electronic valve.

* * * * *